Aug. 21, 1956  H. F. GEORGE ET AL  2,759,416
SYSTEMS PRINTING MACHINE
Filed Feb. 24, 1953  8 Sheets-Sheet 1

INVENTOR.
HARVEY F. GEORGE
WILLIAM WARD DAVIDSON
BY

INVENTOR.
HARVEY F. GEORGE
WILLIAM WARD DAVIDSON

Aug. 21, 1956    H. F. GEORGE ET AL    2,759,416
SYSTEMS PRINTING MACHINE
Filed Feb. 24, 1953    8 Sheets-Sheet 5
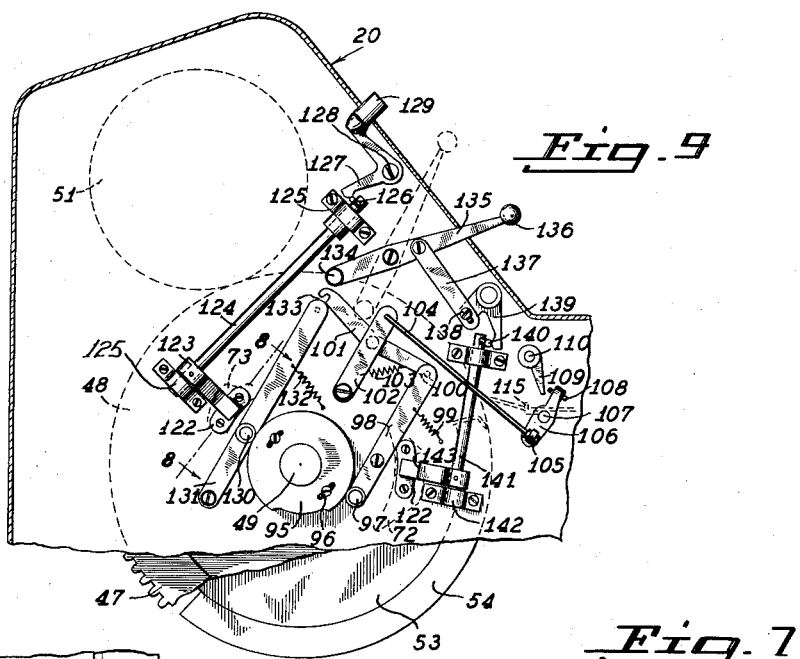
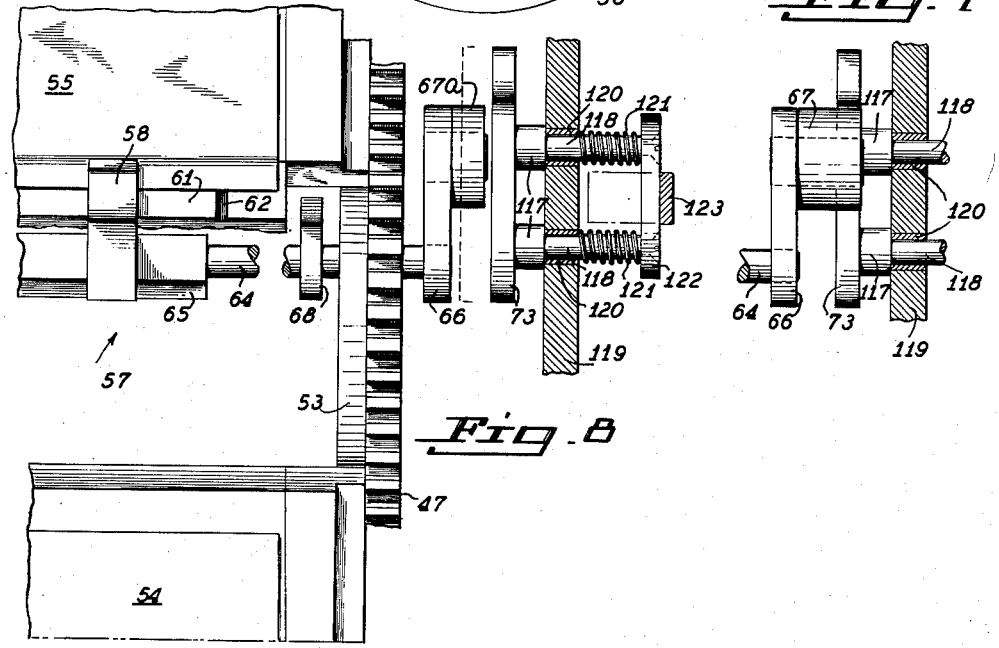
INVENTOR.
HARVEY F. GEORGE
WILLIAM WARD DAVIDSON
BY

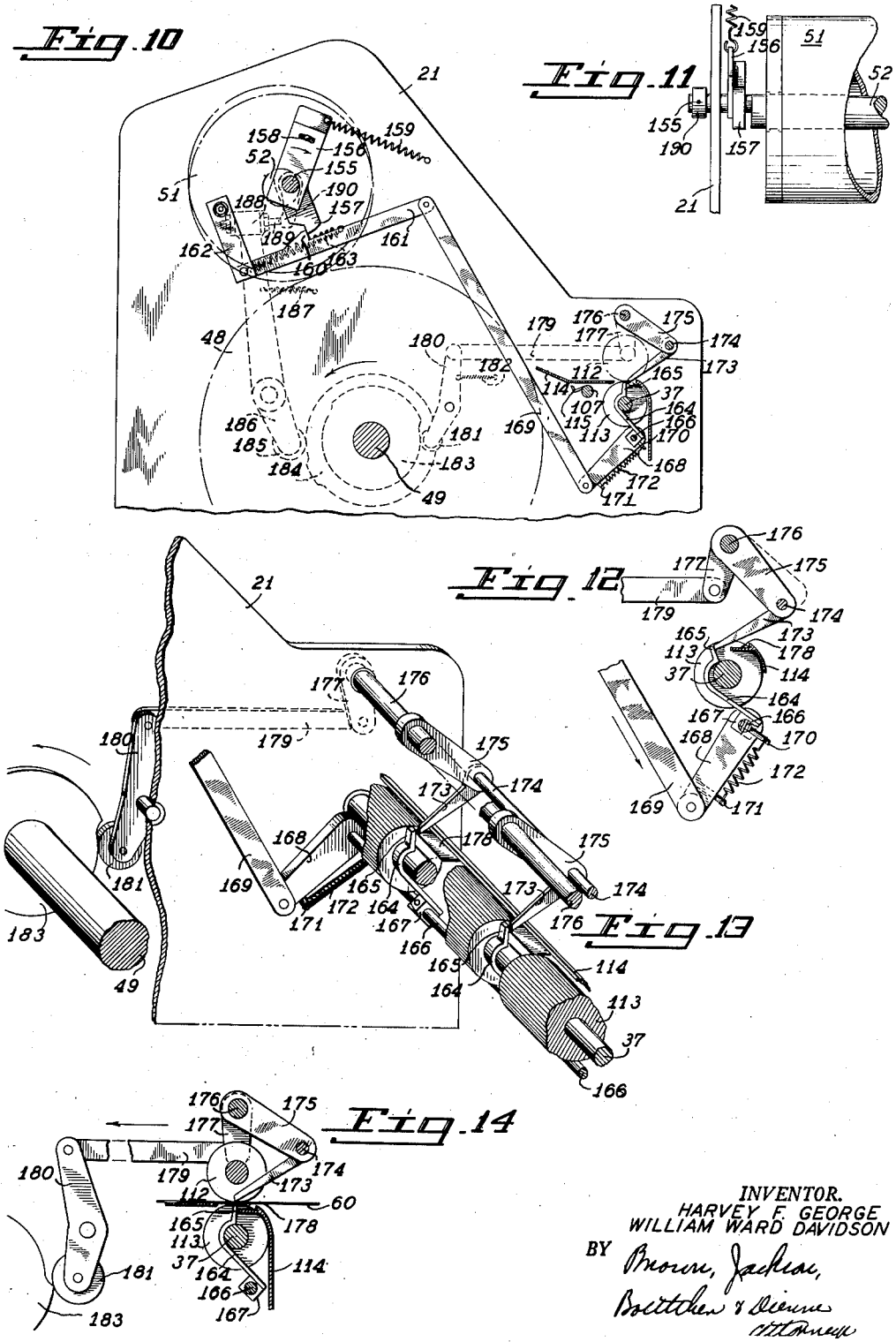

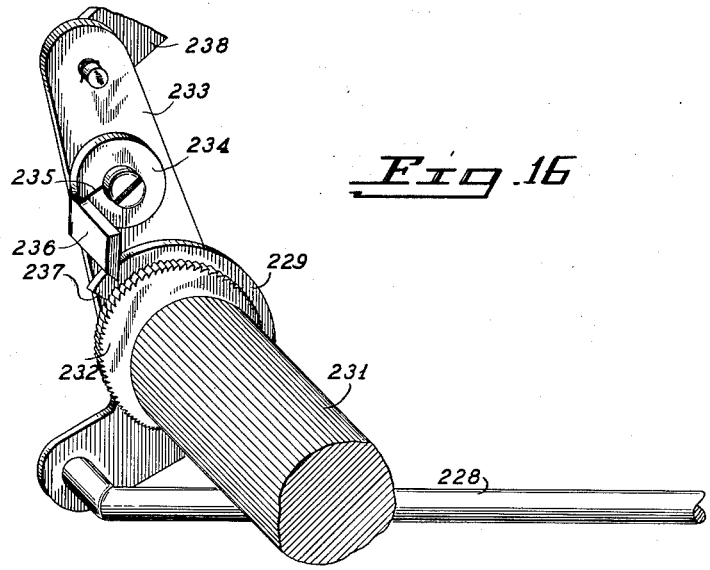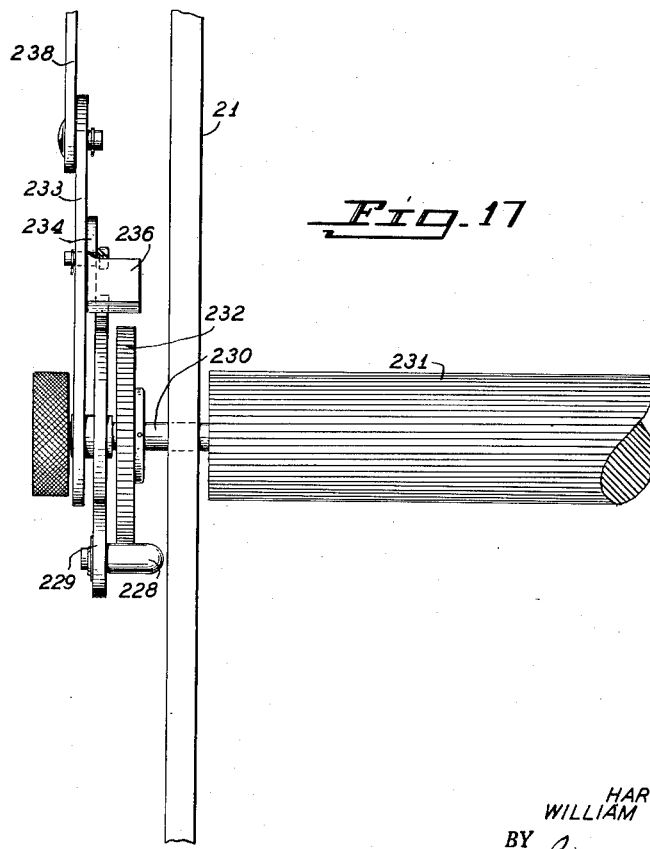

United States Patent Office 2,759,416
Patented Aug. 21, 1956

2,759,416

SYSTEMS PRINTING MACHINE

Harvey F. George, Richmond Hill, and William Ward Davidson, New York, N. Y., assignors to Davidson Corporation, Chicago, Ill., a corporation of Illinois Application February 24, 1953, Serial No. 338,272

26 Claims. (Cl. 101—217)

The present invention relates to printing machines, and it is an object of the present invention to provide an improved printing machine adapted to be used for direct and/or offset printing and particularly adapted for systems duplication and other similar printing operations.

Systems duplication printing relates to the duplication of printed forms or the like used in filing, accounting and like systems. In this type of printing, the number of duplicates to be made from a single master or printing plate is relatively small, but a large variety or number of forms are required to be printed. In other words, relatively few copies are printed from each plate or master, but a large number of plates, as many as several hundred per day, must be handled. Heretofore, various machines have been proposed for the accomplishment of systems duplication and like printing, but these machines have failed to provide a satisfactory solution to the problems presented.

Machines of the character referred to must meet rigid specifications, among which are the following: The machine must provide for extreme ease or simplicity of operation due to the fact that the same are usually operated by office personnel having little or no technical ability or mechanical aptitude; the machines must be designed to cope with or offset operator fatigue resulting from the repetitive nature of the work; all of the controls for the machine should be disposed within convenient reach of the operator's normal position, so that printing control can be constantly and efficiently maintained; the machine should be so constructed that the printing masters or plates can be readily attached and released; the printed copy should be delivered to a position within view of the operator, so that the operator can judge, without changing position, the controls that should be effected to produce good copy; and the machine should provide for as nearly full automatic operation as is possible to lessen the burden on the operator and to provide for efficient duplication. While the foregoing are only some of the requirements of a machine of the general character, it is to be pointed out that it is with respect to these requirements that prior developments in the art have failed particularly.

It is an object of the present invention to provide an improved printing machine, particularly adapted for systems duplication, that meets all of the foregoing specifications and provides an ease, simplicity and efficiency of operation heretofore unattained in the art.

Another object of the invention is to provide an improved printing machine wherein all operations to be performed by the machine operator may be readily and conveniently effected from a single position, the operator's paper feed position, and wherein the essential components of the machine and the copy delivery tray are within direct view of the operator from said position.

A further object of the present invention is the provision of an improved printing machine including instrumentalities, disposed within ready reach of the operator, for selectively turning the ink and dampening fluid on and off and for selectively varying the flow or application of ink and dampening fluid.

While not expressly pointed out hereinbefore, a usual characteristic of systems duplication is that the printing plates are direct or positive, that is directly readable, image masters. In view of this characteristic, it is an object of the present invention to provide a printing machine of the offset type including a plate surface, a platen surface and a blanket or image transferring surface, the arrangement being such that an ink negative or reverse image is applied to the blanket surface from the direct or positive plate on the plate surface, which negative image is subsequently transferred onto a sheet of paper attached to the platen surface, which latter image will appear upon the sheet of paper as a direct or positive image.

In accordance with the foregoing, another object of the invention is to provide means for automatically attaching and releasing printing masters or plates directly from the operator's position without stopping the machine.

More specifically, it is an object of the invention to provide a first control instrumentality for releasing a printing plate from the machine whereby the plate is delivered into the copy delivery tray on top of the copies printed therefrom, and a second control instrumentality operable to effect automatic feeding and attachment of printing plates directly from the operator's position and in a manner substantially identical to the feeding of paper to the machine.

A further object of the invention is the provision of an improved printing machine including a control instrumentality, disposed within ready reach of the operator, for automatically cleaning the image transferring or blanket surface of the machine when required.

In accordance with the foregoing objects, the present invention provides a machine adapted for use in the following manner: The operator assumes a comfortable standing or sitting position in front, or to the feed side, of the machine. From this position, all of the machine controls and the paper feed tray are within clear view and ready reach of the operator, and the principal components of the machine, as well as the copy delivery tray, are in the operator's line of vision. To use the machine, the operator performs the following operations: (1) to start the machine, a suitable on-off button or switch is actuated; (2) a printing master or plate is placed on the feed tray; (3) the plate attaching control instrumentality is manually actuated; (4) the printing plate is manually fed partially into the machine (thereafter, the machine will take over at a predetermined point in the cycle of operation of the machine to automatically feed and attach the plate to the plate surface); (5) the plate attaching control instrumentality is returned to its normal position after the printing plate has been fed into the machine; (6) the ink and dampening fluid are turned on by manual operation of the respective on-off control instrumentalities; (7) sheets of paper are fed individually partially into the machine (the machine itself takes over at a predetermined point in the cycle of operation thereof to automatically feed and attach the individual sheets of paper to the platen surface); (8) the plate, platen and blanket surfaces and the copy in the tray are viewed to make a determination regarding any adjustments that may be required in the amount of ink and/or dampening fluid to be applied; (9) the machine preferably includes a counter providing the operator with a visual indication of the number of copies made from a particular printing plate; (10) when the proper number of copies have been made from a single plate, the ink and dampening fluid on-off control instrumentalities are both moved to their off positions; (11) the plate releasing control instrumentality is manually operated (the machine takes over automatically to release and strip the printing plate from the plate surface and to feed the plate into the copy delivery tray, after which the plate releasing control instrumentality is released or returned to its normal position); (12) the blanket cleaning control instrumentality is then manually actuated to clean the blanket surface, the instrumentality being released or returned to its normal position when the blanket is clean, as determined by visual observation; and (13) the cycle of operation represented by the foregoing steps (2) to (12), inclusive, is then repeated.

From the operation of the machine, as described immediately hereinbefore, it will be apparent that all operations to be effected by the machine operator are effected from a single comfortable position and that the machine does not require the operator to move around or otherwise assume various positions at the machine during operation thereof. It will also be apparent that the operation of the machine is simplicity itself, that the machine is entirely safe and efficient, that the machine even as operated by unskilled personnel will perform at high production rates, and that the machine operator will not suffer fatigue. It will be further appreciated that the machine of the present invention meets all of the specifications set forth hereinbefore, which specifications have not been satisfactorily met by prior developments in the art.

In addition to the foregoing, it is an object of the present invention to provide an improved printing machine of the offset type including a plate and platen cylinder, a blanket cylinder and paper feed means, wherein the point of tangency between the plate and platen cylinder and the blanket cylinder and the point of paper feed to the plate and platen cylinder are disposed at particular angles, or within predetermined angular limits, so as to provide for maximum accessibility to the various components of the machne.

Another object of the present invention is to provide an improved printing machine including improved paper gripping means to facilitate the automatic attachment and release of sheets of paper fed to and printed by the machine.

Still another object of the invention is to provide an improved printing machine including improved gripping means, wherein paper gripping means and plate gripping means of substantially identical structure and operation are provided for facilitating the automatic feeding, attachment and release of both paper and printing plates and wherein the sheets of paper and the printing plates are fed to the machine from a common station.

A further object of the invention is the provision of an improved printing machine provided with paper gripping means and plate gripping means as set forth above and including means for automatically effecting a change in the timing of automatic feeding means, whereby both paper and printing plates may be automatically fed to the machine through common feeding means and from a common station.

In addition to the foregoing, it is an object of the present invention to provide a direct printing machine adapted for letterpress and direct lithographic printing, which machine accomplishes and enjoys several of the objects and advantages set forth hereinbefore.

It is also an object of the present invention to provide an improved printing machine adapted for use as an offset press or a direct printing press, wherein operation of the machine for offset printing is the same as set forth hereinbefore and wherein use of the machine for direct printing attains several of the objects and advantages set forth.

A still further object of the invention is the provision of improved printing machines that are economical of manufacture and assembly, that are easily used or operated, and that are highly efficient and have a high production rate in use.

Other objects and advantages of the present invention will become apparent in the following detailed description of preferred embodiments of the invention.

Now, in order to acquaint those skilled in the art with the manner of constructing and using the machine of the present invention, preferred embodiments of the printing machine and the manner of constructing and using the same will be described hereinafter, in connection with the accompanying drawings.

In the drawings:

Figure 7 is a view, partly in elevation and partly in section, of a portion of the paper gripper means;

Figure 8 is a partial plan view of the plate gripper means, the portions of the view in section being taken substantially on line 8—8 of Figure 9;

Figure 9 is a partial vertical cross-sectional view taken through the left side frame of the machine as is indicated by the line 9—9 in Figure 1, the view showing the control mechanisms for the plate changing means and the feed timing changing means.

Figure 1:
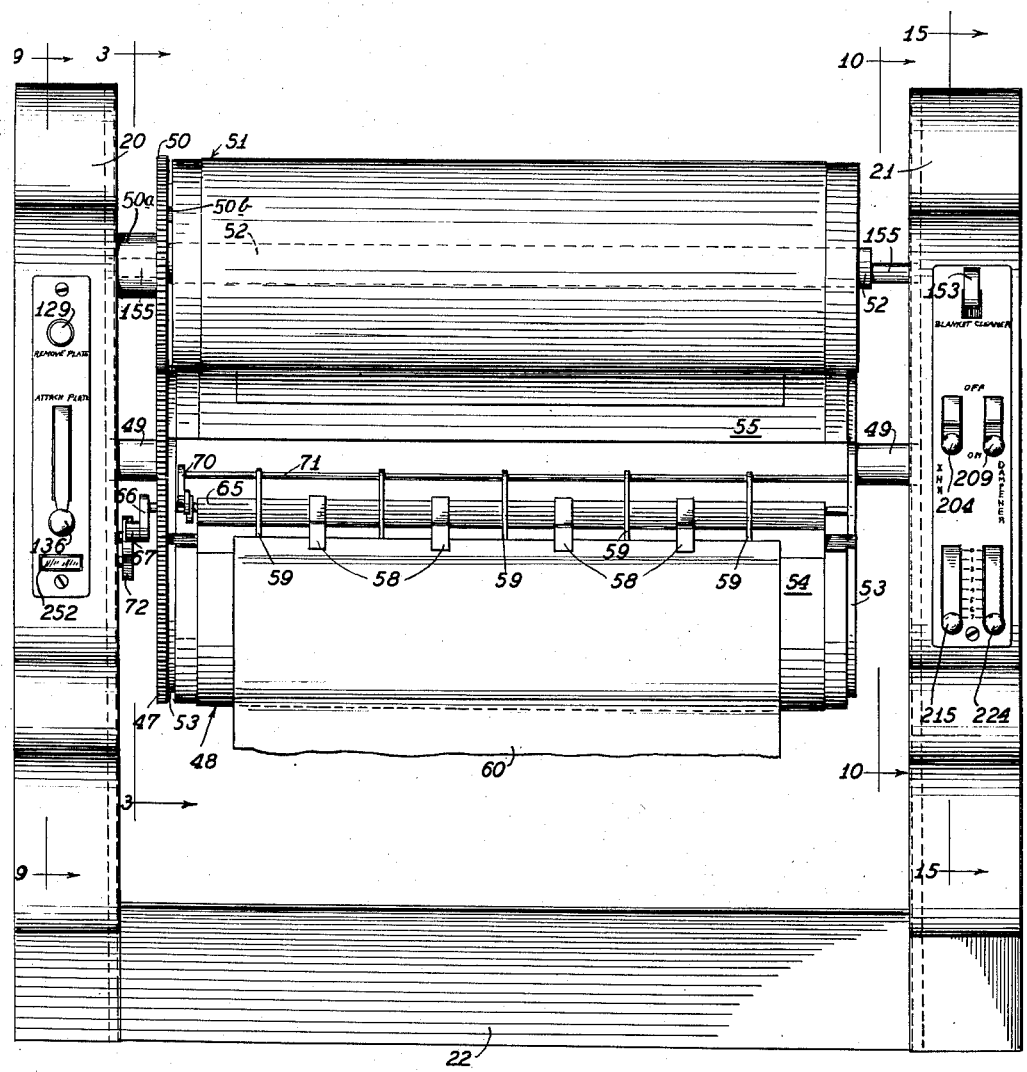
Figure 1 is an elevational view of the frame, printing cylinders and gripping means of the machine, the view being taken in a direction looking downwardly at an angle of approximately 45° upon the front of the machine, as is indicated by the line 1—1 in Figure 2.
Figure 15:
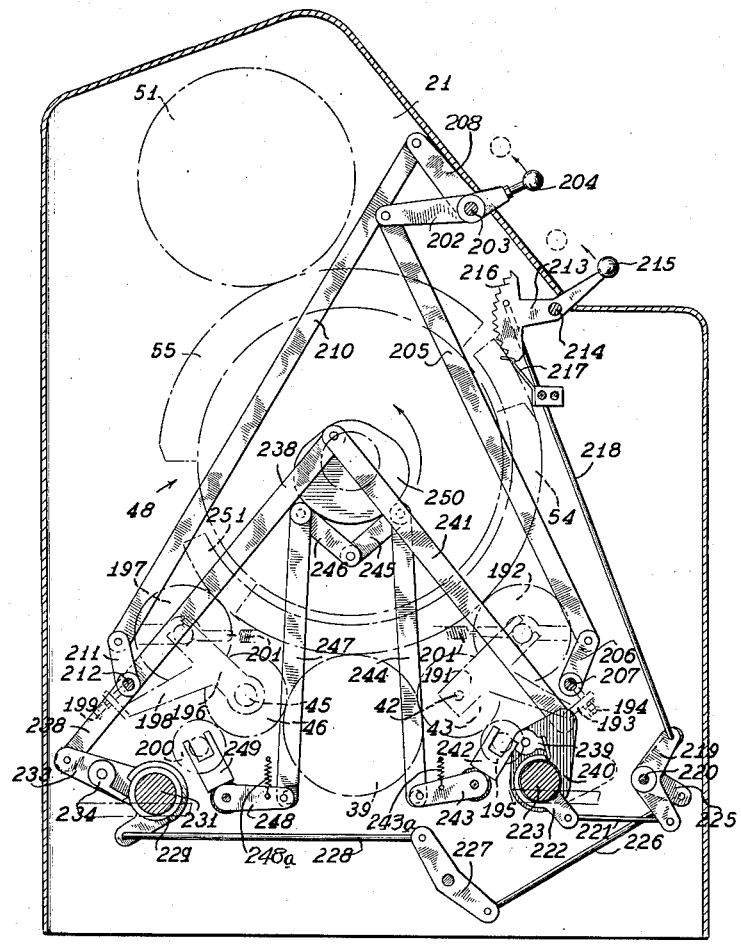

Figure 10 is a vertical cross-sectional view taken from the inside of the right side frame of the machine as indicated by the line 10—10 in Figure 1, the view showing the control mechanisms for sensing the presence or absence of paper and for swinging the blanket cylinder out of engagement with the plate and platen cylinder in the absence of paper feed to the machine, the plate and platen cylinder and the blanket cylinder, which are disposed forwardly of the view, being shown in phantom lines;

Figure 11 is a partial elevational view of the apparatus for controlling movement of the blanket into and out of engagement with the plate and platen cylinder;

Figure 12 is a partial side view, partly in section and partly in elevation, of a portion of the paper sensing apparatus, showing the operation of the same in the absence of paper feed;

Figure 13 is a fragmentary perspective view of the paper sensing apparatus;

Figure 14 is a view similar to Figure 12, but showing the operation of the apparatus when paper is properly fed to the machine;

Figure 15 is a partial vertical cross-sectional view taken through the right side frame of the machine as indicated by the line 15—15 in Figure 1, the view showing the inking and dampening controls in elevation and the apparatus disposed inwardly of the view in phantom lines;

Figure 16 is a fragmentary perspective view of the means for controlling the amount of inking and/or dampening; and Figure 17 is an elevational view of the apparatus shown in Figure 16.

Figure 2:
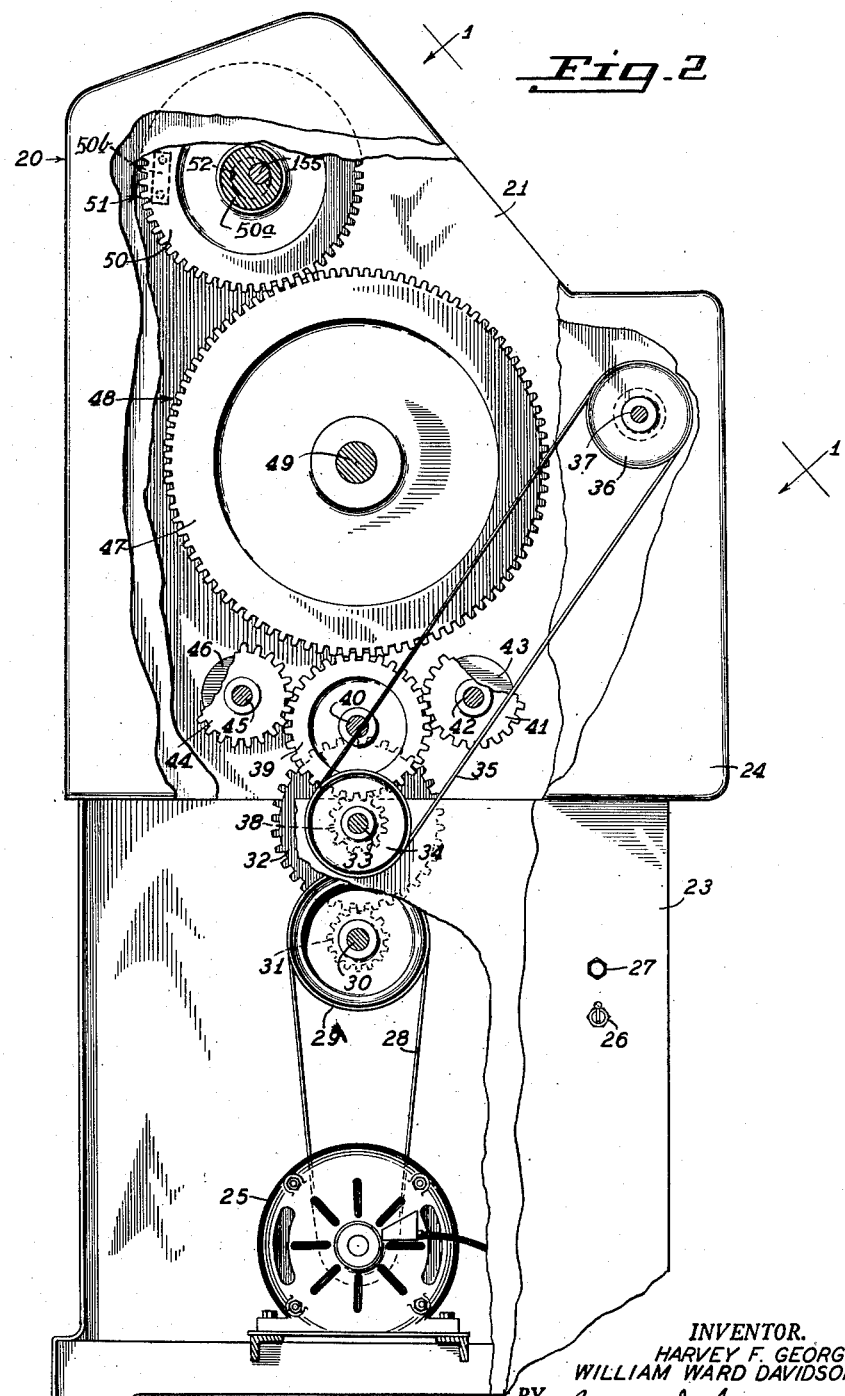
Figure 2 is a side view, partly in section and partly in elevation, taken from the left hand side of Figure 1.

Referring now to Figure 1, the machine of the present invention is shown as including suitable framing comprising a pair of side frames 20 and 21 between which the printing cylinders are mounted, and suitable cross framing 22 extending between and bracing the side frames 20 and 21. As shown in Figure 2, each side frame includes a lower frame portion or subframe 23 and an upper frame portion or subframe 24. Each of the frames described is preferably capable of ready detachment and the side frames 20 and 21 are each hollow for the reception of control mechanisms to be described hereinafter. To provide ready access to the control mechanisms disposed therein, the side frames 20 and 21 are preferably capable of ready disassembly, or are provided with access openings to facilitate repair and adjustment of the control and operating mechanisms disposed therein.

The means for driving the various components of the printing machine of the present invention is preferably disposed intermediate the side frames 20 and 21 and, as shown in Figure 2, preferably comprises an electric motor 25 suitably controlled by an electric switch 26 mounted on the outside surface of the lower frame portion 23 of the left side frame 20. To provide a visual indication of motor operation, an electric light 27 is located adjacent the switch 26 and is suitably connected in the circuit of the switch and the motor so as to be illuminated when the motor is running.

The drive shaft of the motor 25 is suitably equipped with a pulley (not shown) over which an endless belt 28 is reaved for driving a pulley 29 suitably secured to a cross shaft 30, which is journalled in bearings in the side frames 20 and 21. The cross shaft 30 also carries a pinion 31 which meshes with a gear 32 mounted on a shaft 33 also journalled in the side frames 20 and 21. If desired, a centrifugal clutch (not shown) may be operatively associated with the gear 32 and shaft 33 to accommodate turning of the printing cylinders manually without turning the motor. The shaft 33 provides a mounting for a pulley 34 which is preferably disposed within the interior of the side frame 20. An endless belt 35 is suitably reaved over the pulley 34 to establish driving connection between the pulley 34 and a pulley 36 secured to a shaft 37, which shaft is journalled in bearings in the side frames and upon which the lower paper feed roller is mounted, as will be described in detail hereinafter. The shaft 33 also carries a pinion 38 which meshes with a gear 39 fixed to a shaft 40. The shaft 40 is journalled in bearings in the upper side frames and the gear 39 carried thereby meshes at one side with a gear 41 fixed to a shaft 42 upon which an ink distributing or transfer and drive roller 43 is mounted. At the other side thereof, the gear 39 meshes with a gear 44 secured to a shaft 45 upon which a dampening fluid distributing or transfer and drive roller 46 is mounted. As will be apparent, the shafts 42 and 45 are journalled for rotation in the side frames 20 and 21. At its upper side, the gear 39 meshes with a ring gear 47 secured to one side of a drum or cylinder 48 comprising one of the printing cylinders of the machine. The drum 48 is suitably mounted upon a cross shaft 49 which is journalled at its opposite ends in bearings in the side frames. The ring gear 47 meshes with a ring gear 50 which is disposed to one side of and has driving connection with a second drum or cylinder 51 comprising another printing cylinder of the press. The cylinder 51 is rotatably mounted on a shaft 52 which is supported at its opposite ends in the side frames 20 and 21 in a manner to be described in detail hereinafter. The gear 50 is journalled for rotation on a shaft 50a which is mounted in the side frame 20.

Figure 3:
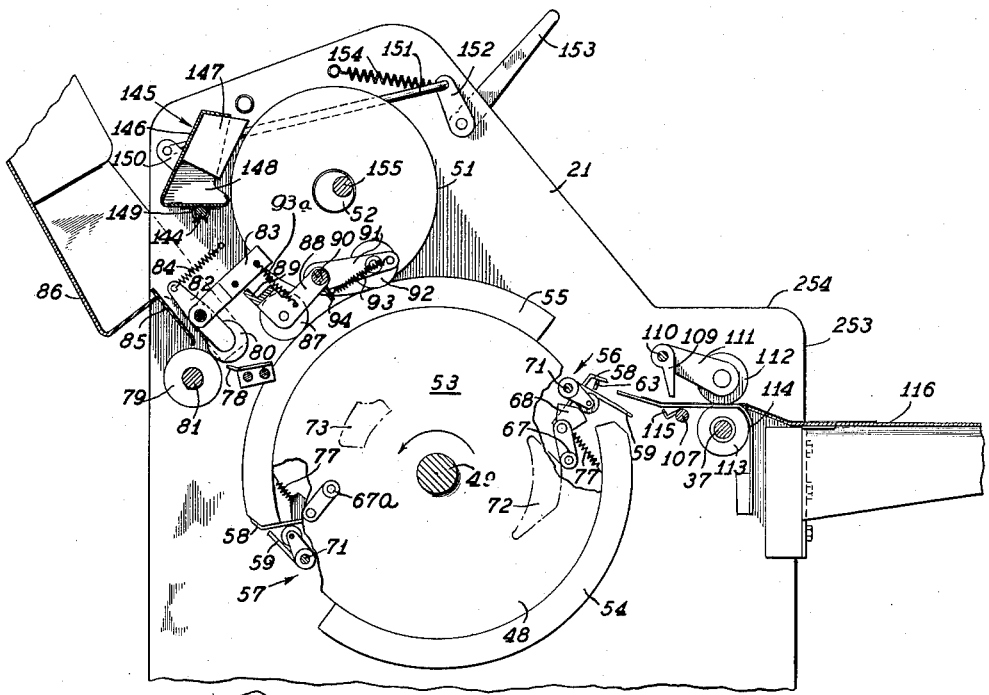
Figure 3 is a partial vertical cross-sectional view of the machine, taken from inside of the left side frame of the machine as indicated by the line 3—3 in Figure 1, with portions of the plate and platen cylinder being broken away to reveal the novel paper and plate gripping means of the invention.

Referring now to Figure 3, the cylinder 48 is shown as comprising the shaft 49, a pair of circular end plates or discs 53 and a pair of segments 54 and 55 secured to the peripheral margins of the end plates 53. The segments 54 and 55 are substantially semi-circular in form, but each is of less than 180° in circular extent so that the two segments are spaced apart at both ends thereof when secured to the end plates 53. The cylinder 51 may be constructed in various known manners and presents a circumferential surface adapted to engage the segments 54 and 55 as the cylinders are rotated. Generally stated, the cylinder 51 has a continuous surface except for the provision of relatively narrow gaps to accommodate the gripper bars on the plate and platen cylinder and to accommodate means for clamping a blanket to the blanket cylinder.

While several aspects of the present invention are not restricted in application to printing presses of a particular type, the complete machine as shown is of the offset type. As pointed out hereinbefore, offset printing is conducted with the use of a direct reading master or plate that is inked to transfer a reverse or negative ink image to a surface, the blanket surface, from which surface the ink negative is transferred as a positive to a sheet of paper. Accordingly, an offset press must provide a plate surface, a blanket surface and a platen surface, with the blanket surface engaging both the plate and platen surfaces in properly timed relation to effect printing. In the offset press of the present invention, the segment cylinder 48 comprises a plate and platen cylinder in that the segments 54 and 55 comprise, respectively, a platen segment and a plate segment, which segments each provide an area or surface adapted for the reception of sheets of paper and printing masters or plates, respectively. The cylinder 51 comprises the blanket surface and, to provide for proper timing, is formed of one-half the size, or having a circumference one-half that of the segment cylinder 48.

In use, as the cylinders 48 and 51 are rotated, the plate segment 55 engages the blanket cylinder 51 for substantially one full turn of the blanket cylinder. Subsequently, the platen, impression, or paper segment 54 will engage the blanket cylinder for the same cycle of blanket cylinder movement so that an image transferred to the blanket surface from the plate surface or segment will be applied to the platen surface or the sheet of paper thereon. Then upon the next cycle of segment cylinder rotation, the plate segment will engage the blanket cylinder in perfect registry with the initial engagement between the two surfaces whereby perfect image registry is maintained at all times.

As pointed out hereinbefore, certain aspects of the invention are not restricted in application to particular types of printing machines and, likewise, are not restricted to the particular type of offset press disclosed herein.

From the foregoing, it will be appreciated that the plate and platen cylinder 48 is hollow and that, due to the circumferential spacing between the segments 54 and 55, diametrically opposed peripheral openings are provided in the cylinder. Within one of the openings, a paper gripper mechanism, indicated generally at 56, is mounted and within the other opening a plate gripper mechanism, indicated generally at 57, is mounted. With one exception, which will be pointed out hereinafter, the paper and plate grippers are identical and, accordingly, only one of the mechanisms, the paper gripper, will be specifically described hereinafter.

Referring to Figures 3 to 6, the paper gripper means of the present invention is shown as including a pair of fingers 58 and 59 adapted for the reception therebetween of a sheet of paper 60. The two fingers cooperate to receive and guide the sheet of paper and the upper finger 58 comprises a gripper or clamping finger as will become apparent hereinafter. While the lower finger 59 has a unique function in receiving sheets of paper, the same also serves to eject the paper in a manner to be described hereinafter. Accordingly, the finger 59 will be referred to herein for purposes of clarity, as an ejector finger. In use, the gripper finger 58 is adapted to clamp the paper 60 against an inclined forward edge portion or anvil surface 61 of the platen segment 54. To accommodate clamping of the paper 60 to the anvil surface 61, the anvil is preferably provided with a recess 62 adapted for the reception of the ejector finger 59 so that the ejector finger will not interfere with clamping or gripping of the paper 60. To limit the introduction of paper so that the gripper finger will only grasp the edge thereof to insure proper disposition of the paper on the platen surface 54, the finger 58 is provided with a downwardly projecting stop or abutment portion or member 63 adapted to be engaged by the edge of the paper as the paper is fed into the machine. To accommodate the stop member 63, the leading edge of the platen segment or anvil is provided with a recess merging with the surface 61.

Figure 4:
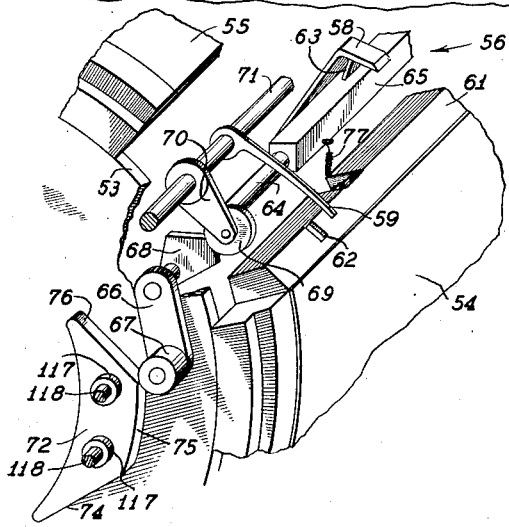
Figure 4 is a fragmentary perspective view, on an enlarged scale, of the novel gripping means.
Figure 5:
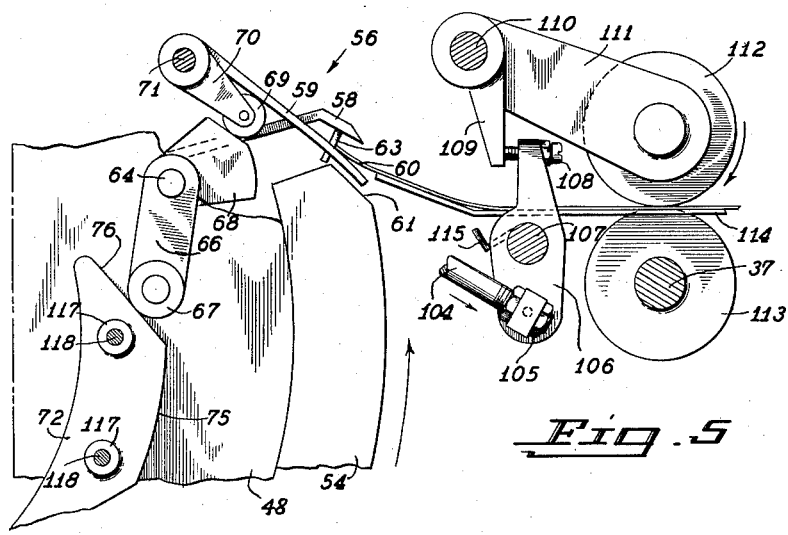
Figure 5 is a partial side elevation of the gripping and feeding means and associated apparatus, as shown in Figure 4, on an enlarged scale, the view showing the stage of machine operation wherein the gripper commences closing movement.
Figure 6:
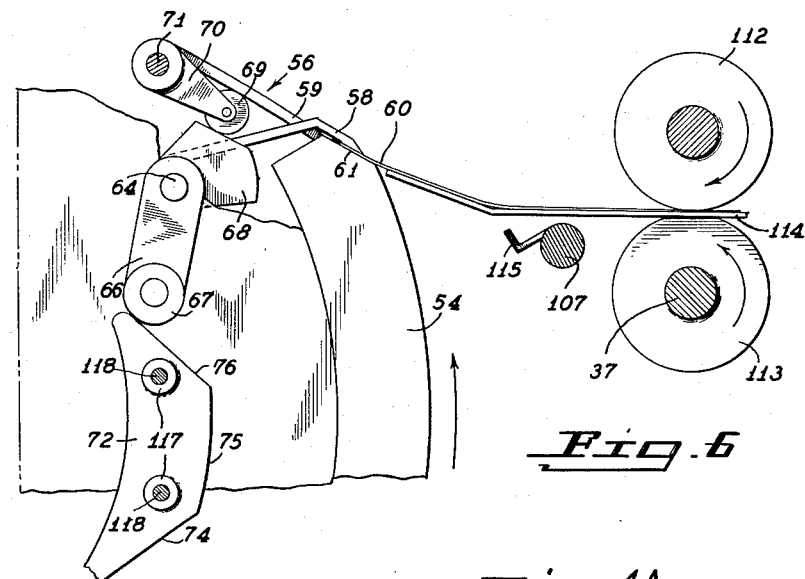
Figure 6 is a view similar to Figure 5 showing the gripper in closed position.

As shown in Figures 4, 5 and 6, the gripper finger 58 includes an outer paper gripping portion and a shank portion which is secured at its inner end to a shaft 64. While the shaft 64 may take any desired configuration, it preferably includes a square portion 65 to facilitate mounting of the gripping finger 58. Adjacent its outer ends, the shaft 64 is rounded and is journalled in the end plates 53 adjacent the periphery thereof. To the exterior of one end plate 53, the left side plate, the shaft 64 is provided with a crank arm or lever 66 which carries a cam follower or roller 67. To the inside of the end plate 53, the gripping finger shaft 64 carries a cam 68 adapted for cooperation with a cam follower or roller 69 secured to a crank arm or lever 70 which in turn is secured to a shaft 71 that is journalled at its opposite ends in the drum end plates or discs 53. The shaft 71 provides a mounting for the ejector finger 59. In use, the cam follower or roller 67 is adapted for cooperation with and actuation by a pair of cams 72 and 73 supported by the left side frame 20 at spaced points in the orbital path of rotation of the roller 67.

In use and operation, the segment cylinder 48 is rotated in the direction indicated by the arrow in Figure 3. As the cylinder 48 rotates to bring the paper gripper around to the right side of the machine as shown in Figure 3, that is, to the forward or feed side of the machine, the roller 67 engages a leading surface 74 of the cam 72, which cam will be referred to hereinafter as the feed-side cam. Upon continued rotation, the roller 67 will be forced outwardly due to its passage over the leading surface 74 of the cam 72, upon the occurrence of which movement the crank arm 66 will be swung in an arc about the axis of the shaft 64 to pivot the shaft 64 whereupon the gripper finger 58 is swung away from the anvil surface 61. At the same time, the cam 68 carried by the gripper finger shaft 64 is moved in an arc to force the cam follower 69 outwardly, whereby the shaft 71 is pivoted to a limited extent with respect to the movement of the shaft 64 to effect partial elevation of the ejector finger 59. As the cam follower 67 engages the mean surface 75 of the cam 72, the gripper finger 58 and the ejector finger 59 will be moved to a fully open position and will be retained in such position for a predetermined time, during which a sheet of paper is fed to the machine, the sheet of paper 60 being automatically moved into engagement with the abutment or stop 63 on the finger 58. Thereafter, the cam 72 will be passed to a sufficient extent so that the roller or follower 67 will be brought into engagement with the trailing or declining surface 76 of the cam at which time a spring 77, secured at its opposite ends to the squared portion 65 of the shaft 74 and the forward lower edge of the anvil, will bias the shaft 64 in a direction to maintain the follower 67 in engagement with the surface 76 of the cam 72. Accordingly, as the follower 67 rides down the trailing surface 76 of the cam 72, the gripper finger 58 will be moved toward closed position by the spring 77. At the same time, the cam 68 will be rotated in such direction as to free the cam follower 69 and accommodate reentry of the ejector finger 59 into its recess 62. Figure 5 clearly shows the paper gripping means as the same commences its closing movement, and Figure 6 shows the gripper means in its fully closed position, in which position the roller or cam follower 67 is moving away from the cam 72 so as to provide clearance between the two.

The provision of cam actutaing means between the two shafts accommodates the provision of a delayed action response on the part of the ejector finger to gripper finger opening and immediate response of the ejector finger to closing movement, so that the ejector finger is moved away from the anvil surface after the gripper is opened and is moved to the anvil surface before the gripper is closed. Such arrangement provides a compound camming action resulting in a novel clamping action that offers a long period of time during which paper may be fed to the gripper and against the stop member 63. During feed of paper to the gripper, the fingers 58 and 59 receive the paper therebetween and guide the same to proper position. In this respect, the ejector finger 59 has a unique function in that the same is practically stationary with respect to the leading edge of the incoming sheet to receive and guide that edge.

The gripper mechanism of the present invention has been described with respect to Figures 4, 5 and 6 as comprising a single gripping or clamping finger 58 and a single ejecting finger 59. However, it will be appreciated from Figure 1 that several such fingers are provided longitudinally of the plate and platen cylinder to insure proper and uniform gripping and ejecting of sheets of paper.

From the foregoing, it will be appreciated that the gripper means of the present invention accommodates ready and convenient introduction of sheets of paper to the machine at a rapid rate while the machine is in operation. Upon continued rotation of the segment cylinder, the paper gripped by the fingers 58 are passed between the segment cylinder and the blanket 51, whereupon the paper is printed, and thereafter the cam follower 67 is moved into engagement with the cam 73, which will be referred to hereinafter as the discharge or stripper cam. The discharge cam 73 is, to all effects and purposes, substantially identical to the feed-side cam 72 so that as the cam follower 67 engages the cam 73, the gripper fingers 58 are moved away from the anvil surface 61 to free the sheet of paper and the ejector fingers 59 are elevated to raise the forward edge of the sheet of paper. The cam 73 is so located that as the ejector fingers 59 are moved to fully elevated position, the edges of the paper, or the leading edge of the paper, in its elevated position, is moved into engagement with a stripper fixture or bracket 78 which is suitably mounted to and extends between the side frames 20 and 21. As will become apparent as the description proceeds, the member 78 and associated apparatus comprise a common stripping or discharge station for both plates and paper.

As the elevated sheet of paper is brought into engagement with the stripper plate 78, the stripper plate 78 guides the leading edge of the paper between a pair of delivery rollers 79 and 80. Preferably, the roller 79 is mounted on a shaft 81 which is suitably driven in any conventional manner from the electric motor 25, the drive connection not being shown. The roller 80 is rotatably mounted on a lever arm 82 which is mounted intermediate its ends for pivotal movement on a shaft supported by a bracket 83 which is secured to one of the side frames. A spring 84 is connected between the free end of the lever arm 82 and a fixed pin or the like on one of the side frames so as normally to bias the roller 80 into firm engagement with the driven roller 79. Accordingly, as the leading edge of the paper is introduced into the bite between the rollers, the roller 79 will drive the same forcibly over the lip portion 85 of a delivery chute 86 aligned with the rollers 79 and 80 and then into the delivery chute or tray. Preferably, the delivery tray 86 is pivotally adjustable for different length runs. If the stripper plate or bracket 78 extends continuously across the surface of the segment cylinder, the same is suitably provided with slots to accommodate ready passage of the fingers 58 and 59 in their elevated positions.

To assist the stripper plate 78 in effectively removing a sheet of paper from the paper segment 54, a plurality of stripper rollers 87, see Figure 3, are provided in aligned relation longitudinally of the plate and platen cylinder 48 for exerting pressure on the paper at a point spaced from the portion thereof being stripped so as to facilitate the stripping action. The stripper rollers 87 are individually journalled on arms (not shown) which are secured to a common mounting angle bar 89. A lever 88, in the nature of a bell crank, is secured to each end of the bar 89. At the free end thereof, each lever 88 is mounted upon an end or stub shaft 90, the shafts being suitably supported by the respective side frames. For the purpose of exerting adequate pressure on the rollers 87, a crank or lever arm 91 is pivotally mounted on each stub shaft 90 and carries a cam follower or roller 92 adjacent its outer end. At the outer end thereof, the crank arm 91 carries a pin to which one end of a tension spring 93 is connected, the opposite end of the spring being connected to a pin 94 which is operatively associated with the lever 88, the spring serving to bias the roller 87 into engagement with the paper segment 54. The cam roller 92 is adapted for cooperation with a cam to be described hereinafter, by means of which the cam follower is biased outwardly at predetermined portions of the rotation of the segment cylinder to exert pressure on the stripping rollers 87.

In the preferred structure, the pin 94 extends through and is fitted in a diametrical bore in the stub shaft 90, the stub shaft 90 is rotatably journalled in one wall of the side frame, and the lever 88 is fixed to the shaft 90. The rollers 87 do not normally engage the plate and platen segments 54 and 55, the same being biased away from the segments by a spring 93a to prevent entry of the rollers into the peripheral openings in the segment cylinder. When the cam to be described hereinafter engages the roller 92, an increased bias is exerted on the spring 93 to overcome the normal bias of the spring 93a whereby the rollers 87 are moved into firm engagement with the platen segment to assist in stripping the paper from the segment, to prevent whipping of the paper and to prevent blurring of the printed image.

Upon further rotation of the segment cylinder 48, the roller 67 is moved away from the cam 73 and thereupon the paper gripper is closed by the spring 77 until the cam follower 67 again engages the leading surface 74 of the cam 72, at which time the operation above described will be repeated.

As pointed out hereinbefore, the plate gripping means 57 is identical to the paper gripping means 56 with one exception, which exception resides solely in the axial or longitudinal disposition of the cam follower roller 67. Specifically, the roller 67 of the paper gripping means, as shown in Figure 7, is substantially twice the width or axial extent of the plate gripping roller 67a, which is shown in Figure 8. The purpose of this arrangement will be described in detail hereinafter. As will become more readily apparent as the description proceeds, the plate gripper mechanism 57 operates in the same manner as the paper gripping means to clamp printing plates to the plate surface 55 and to release the same therefrom.

Referring now to Figure 9, the means for automatically feeding paper to the platen segment 54 of the cylinder 48 and the paper gripping means 56 will be described. As shown, the shaft 49 of the segment cylinder 48 extends into the space between the walls of the hollow left side frame 20 and, within the space between said walls, carries a cam 95. The cam 95 is generally circular, but is provided with a peripherally recessed portion for the purposes to be described hereinafter. The cam 95 is preferably mounted on the shaft 49 with accommodation for adjustment. To this end, it may be suitable to secure a mounting plate to the shaft 49 and to secure the cam to this plate for circumferential adjustment by means of a slot and screw arrangement indicated generally at 96. At one side of the cam 95, a cam follower or roller 97 engages the peripheral surfaces of the cam. The follower 97 is mounted at one end, the lower end, of a lever 98 which is pivoted intermediate its ends to one wall of the side frame 20. At the opposite side of the pivotal mounting thereof, the lever 98 is biased by means of a spring 99 in such manner that the roller 97 is maintained in engagement with the peripheral surface of the cam 95. At the upper end thereof, the lever 98 has a detachable slot and pin connection 100 with one end of a rock lever or rocker arm 101 which is pivoted at its central point to an intermediate point on a link 102 which in turn is pivotally mounted at its lower end to one wall of the side frame 20. A tension spring 103 is connected between the link 102 and the side of the lever 101 having engagement with the lever 98 whereby the levers 98 and 101 are normally connected by the slot and pin connection 100. At the end thereof opposite its pivotal mounting, the link 102 has pivotal connection with a rod or link 104 which extends toward the forward or feed side of the machine. At the feed side of the machine, the rod 104 is adjustably connected, as at 105, to a lever 106 which is secured to a shaft 107, which shaft extends between the side frames 20 and 21 and is journalled at its opposite ends in said frames. At the opposite or upper end of the lever 106, a stud 108 is adjustably mounted therein. The stud 108 is adapted for engagement with a crank arm or lever 109 secured to a rock shaft 110 which extends between and is journalled adjacent its opposite ends in bearings in the upper portions of the side frames 20 and 21.

As shown in Figures 3 and 5, the rock shaft 110, intermediate the frames 20 and 21, carries a number of crank or support arms 111 at the outer end of which an upper paper feed roller 112 is mounted for rotation. The upper feed roller 112 is disposed in vertical alignment with a lower paper feed roller 113 mounted on the shaft 37, which, as described hereinbefore, is suitably driven by the electric motor 25. As is clearly shown in Figure 13, the lower feed roller 113 is serrated so as to be capable of driving engagement with sheets of paper fed between the rollers 112 and 113. Between the side frames 20 and 21, a feed guide or plate 114 is mounted in horizontal alignment with the bite of the rollers 112 and 113, which plate 114 extends inwardly of the machine to a point immediately adjacent the peripheral surface of the segment cylinder 48, the plate 114 being turned upwardly at its inner end so as to guide paper fed between the rollers 112 and 113 into the space between the elevated fingers 58 and 59 of the paper gripping means 56. As will become more readily apparent as the description proceeds, the feed guide plate 114 is provided with a transverse slot adapted for the projection therethrough of a portion of the lower feed roller 113 so that the lower feed roller may be directly engaged by the upper feed roller 112. The feed guide or plate 114 is also provided with one or more slots or apertures therein adapted for the passage therethrough of a stop or line-up finger or fingers 115 which are secured to the shaft 107.

At the forward or feed side of the machine, a feed table 116 is provided which extends between the side frames 20 and 21 and is suitably secured at its opposite ends thereto. As will be apparent, the feed table 116 is adapted for the reception of a stack of paper, which paper may be readily fed to the feed rollers 112 and 113 and to the guide plate 114 in any suitable manner. As shown herein, the machine is arranged for the manual feed of paper to the machine, but it will be appreciated that automatic feed means of a known character may be readily associated with the machine for the automatic feeding of sheets of paper. Preferably, the main portion of the feed table 116 is disposed at a level slightly below the guide plate 114 and is provided at its inner portion with an inclined surface for guiding the sheets of paper into the feed rollers 112 and 113.

In use and operation of the machine, the cam 95 is so adjusted on the shaft 49 that the cam follower or roller 97 will enter into the peripherally recessed portion of the cam 95 at the time when the gripper fingers 58 of the paper gripping means 56 are moved to open position due to engagement of the cam follower 67 with the cam 72. Upon entry of the cam follower 97 into the recessed portion of the cam 95, the spring 99 will bias the upper end of the lever 98 to the right, as shown in Figure 9, which results in movement of the lever 101, the link 102 and the rod 104 to the right. As the rod 104 moves to the right, the same oscillates or pivots the lever 106 and shaft 107 so as to move the stud 108 into engagement with the crank arm 109. Prior to this movement, the machine operator, or suitable automatic feeding means, has fed a sheet of paper 60 from the table 116 onto the guide plate 114, between the feed rollers 112 and 113, and into engagement with the stop fingers 115 mounted on the shaft 107. Since the roller 112 rests lightly on the drive feed roller 113, the paper may readily be fed between the rollers and the rollers will not impart any substantial feeding impetus to the sheet of paper. The fingers 115 provide for proper positioning of the sheet of paper and, at the same time, prevent feeding of the paper to the plate and platen cylinder. However, when the operating linkage 97 to 106 pivots the shaft 107, the fingers 115 are swung out of the path of movement of the paper to accommodate feeding thereof to the plate and platen cylinder only at the proper time in the cycle of machine operation. Preferably, a lost-motion arrangement is provided between the stud 108 on the lever 106 and the crank arm 109 so as to accommodate movement of the stop fingers 115 out of the path of movement of the paper prior to actuation of the crank arm 109 by the linkage 97 to 106.

As the stud 108 engages the crank arm 109, the shaft 110 is rocked or pivoted so as to move the upper feed roller 112 into pressure engagement with the lower feed roller 113 under the bias of the spring 99. As the roller 112 is moved into pressure engagement with the roller 113, the sheet of paper 60 previously positioned between the two rollers will be fed automatically by the rollers into the machine and into engagement with the stop or abutment 63 of the gripping fingers 58, after which the operation will be as described hereinafter. As the segment cylinder 58 continues its rotation, the feed rollers 112 and 113 will continue to feed the sheet of paper to the machine, so that the same will lie upon the platen or paper surface 54. The recessed portion of the cam 95 is of such length and the cam is so disposed on the shaft 49 that the operation of the feed rollers 112 and 113 will not be discontinued until the sheet of paper has been completely fed onto the platen segment 54. After the sheet of paper 60 has been fed to the segment cylinder, as described, the cam 95 will move the follower 97 radially outwardly of the cam so as to dispose the various levers in their normal positions, as shown in Figure 9, wherein the pressure on the roller 112 is relieved to cause discontinuation of the ability of the rollers to automatically feed paper to the machine.

Briefly summarizing the foregoing, the machine operator in using the machine will manually feed a sheet of paper between the rollers 112 and 113, during the time that the cam follower 97 is in its normal position, until the foreward or leading edge of the paper engages the stop fingers 115 extending into the path of paper movement. The machine operator may then release the said one sheet of paper and prepare to feed a second sheet of paper to the machine. Then, at the appropriate time during the rotation of the segment cylinder 48, the said one sheet of paper manually fed to the machine will be automatically gripped and advanced or fed by the rollers 112 and 113 to the plate segment 54. Accordingly, it will be appreciated that sheets of paper can be fed to the machine only at the proper time in the cycle of operation of the machine.

As pointed out hereinbefore, one of the predominant features of the machine of the present invention is the feature of automatically changing the printing plate or plates from the feed table of the machine in much the same manner or operation as is required for the feeding of paper to the machine. The apparatus necessary to the accomplishment of this predominant feature includes the provision of a plate surface that is directly accessible from the paper feed table and means associated with that surface for gripping a plate fed to that surface. According to the embodiment disclosed herein, the plate and platen surfaces are provided by a single cylinder so that the plate surface is accessible from the feed table 116 in the same manner as is the platen surface and gripping means 57 are provided at the leading edge of the plate surface. As described hereinbefore, the plate gripper means 57 is identical to the paper gripper means 56, with the exception that the cam follower 67a of the plate gripping means 57 is of less axial extent than the cam follower 67 of the paper gripping means 56. Referring to Figure 8, it will be noted that the cam follower 67a of the plate gripping means 67 is normally disposed so as to have an orbital path of rotation corresponding to that of the roller 67, but lying axially or longitudinally outside of the normal disposition of the cams 72 and 73. The reason for this is that a plate change is made relatively infrequently, whereas paper is fed to the machine at substantially every rotation of the segment cylinder 48. If the cam follower 67a of the plate gripping means were disposed so as to engage the cams 72 and 73 upon each rotation of the segment cylinder, it will be appreciated that the plate would be capable of transferring only a single impression to the blanket. Accordingly, it is essential that the plate gripping means be actuated only at particular desired times, which times should be under the control of the machine operator.

In view of the necessary operation of the machine, the cam follower 67a is so constructed as normally to be disposed for rotation in a path outside of the location of the cams 72 and 73. However, it is a feature of the economical construction of the machine of the present invention that the cams 72 and 73 be utilized to actuate the plate gripping means 57. To this end, the cams 72 and 73 are each individually mounted for movement axially of the segment cylinder into and out of the path of rotation of the roller 67a. As shown in Figure 8, the cam 73 (cam 72 having an identical mounting) is provided on one face thereof with a pair of studs 117 including shaft portions 118 which project through the inner wall 119 of the side frame 20 and are slidably mounted in the wall 119 for movement transversely thereof. Preferably, sleeve bearings 120 are provided in the wall 119 for the slidable reception of the shaft portions 118 of the studs 117. The studs 117 are adapted normally to engage the exterior side of the wall 119 and are normally biased to this position by means of coil springs 121 surrounding the shafts 118 and confined between the inner surface of the wall 119 and a mounting plate 122 connected between the free ends of the shafts 118. Due to this arrangement, the cams 72 and 73 are adapted to be selectively moved into and out of the path of rotation of the cam follower 67a of the plate gripper means 57. It will be appreciated that the cams 72 and 73 are normally disposed outside of the path of rotation of the cam follower 67a. However, the cam follower 67 of the paper gripper means 56 is of such axial extent as to engage the cams 72 and 73 regardless of the disposition thereof.

In operation of the plate gripper means 57, the cams 72 and 73 perform the same functions as described hereinbefore with respect to the paper gripper means 56. In other words, the cam 72 is adapted to actuate the gripper means 57 to effect attachment of a fresh plate to the plate surface or segment 55 and the cam 73 is adapted to actuate the gripper means 57 to accommodate stripping of a used plate from the plate segment. To remove a plate from the plate segment, it is necessary to move the cam 73 into the path of rotation of the cam follower 67a of the plate gripper means. As shown in Figure 8, the cam 73 is adapted to be moved to the position shown in dotted lines, wherein the same is disposed within the path of rotation of the cam follower 67a. To accomplish the aforesaid movement of the cam 73 to effect stripping of the plate from the plate segment 55, a crank arm or lever 123, see Figure 9, which engages the connector plate 122 at its free end, is mounted on a shaft 124 which is suitably journalled adjacent its opposite ends and mounted by means of brackets 125 on the side wall 119 of the left side frame 20. Adjacent the upper end thereof, the shaft 124 is provided with a radially extending pin 126 adapted to be engaged and moved in an arc by means of a bell crank lever 127 which is pivoted at 128 to the wall 119 of the side frame. At its opposite end, the bell crank lever 127 is provided with a control push button 129 extending through the front inclined face or wall of the side frame 20 for convenient manual actuation by the machine operator.

In use and operation of the machine, at a time when it is desired to remove the printing plate, it is merely necessary for the machine operator to depress the button 129. As the button 129 is depressed, the bell crank lever 127 causes movement of the pin 126 in an arc to effect pivotal movement of the shaft 124 and the crank arm or lever 123, thus causing inward movement of the cam 73 into the path of rotation of the cam follower 67a of the plate gripping means 57. The button 129 is held in depressed position until the cam follower 67a engages the cam 73, at which time the plate will be stripped from the plate segment 55 in the manner described hereinbefore with respect to the stripping of sheets of paper from the paper segment 54. To this end, the stripper bracket 78 and the rollers 79 and 80 comprise a common stripping station for stripping sheets of paper and printing plates from the plate and platen cylinder and delivering the same into the common delivery tray 86. From the feed side of the machine, the operator has a clear view of the delivery tray or chute 86 and will immediately notice the delivery of the stripped printing plate into the chute, whereupon the button 129 may be released. As the button is released, the springs 121 return the cam 73 and its actuating linkage to normal position. As will be appreciated, the cam 73 is actuated entirely independently of the cam 72 so that there is no necessity for immediately feeding a new plate to the machine. Accordingly, the machine after stripping of the plate is in condition for cleaning.

After the machine has been cleaned, in a manner to be described in detail hereinafter, it will be desired to feed a fresh or new printing plate to the machine, which operation, as pointed out hereinbefore, is accomplished automatically by the machine of the present invention. As pointed out hereinbefore, the plate gripper means 57 is disposed diametrically opposite the paper gripper means 56 on the segment cylinder. Accordingly, to effect feeding of a fresh plate to the segment cylinder by the means described hereinbefore, it will be necessary to change the timing of the machine so that the paper feed means will be operated 180° out of its normal phase. For this purpose, a cam follower or roller 130 is disposed in engagement with the periphery of the cam 95 at a point diametrically opposite the engagement of the cam follower 97 with the cam 95. The cam follower 130 is mounted on a lever 131 intermediate the ends of the lever and the lever is pivoted at the lower end thereof to the side wall 119 of the frame 20. To the upper side of the cam 95, a spring 132 is associated with the lever 131 so as normally to bias the cam follower 130 into engagement with the cam 95. At its upper end, the lever 131 has a detachable pin and slot connection 133 with the rocker lever 101. As is clearly shown in Figure 9, the levers 101 and 131 are normally disconnected due to the provision of the spring 103. Accordingly, to effect a shifting of the operation of the feed rollers 112 and 113 180° out of normal phase, it is necessary to disconnect the levers 98 and 101 and to effect a connection between the levers 101 and 131. For this purpose, a roller 134 is mounted on a lever 135 in such manner as to be capable of movement into engagement with the left side of the lever 101, so as to move that side of the lever into connected engagement with the lever 131 and to effect a disconnection between the levers 98 and 101. As shown, the lever 135 is pivotally mounted on the wall 119 of the frame 20 and includes a portion extending through the inclined front face of the frame 20 and terminating exteriorly of the machine frame in a manually engageable handle 136. In use, the handle 136 is normally disposed in the position shown in solid lines in Figure 9, but is adapted to be moved to the position shown in dotted lines wherein the roller 134 is moved into engagement with the lever 101 to effect disconnection between the levers 98 and 101 and to effect a connection between the levers 101 and 131. Accordingly, it will be appreciated that the feed rollers 112 and 113 will then be under control of the cam follower 130, rather than the cam follower 97, and that the operation of the feed rollers 112 and 113 will be effected 180° out of normal phase.

At the same time as the feed means is actuated to effect feeding of a new plate to the segment cylinder, it will be necessary to effect actuation of the plate gripper means 57 so that the new plate will be received upon and secured to the plate segment 55. To automatically effect actuation of the plate gripper means in properly timed sequence with the actuation of the feed rollers 112 and 113, a link 137 is pivotally connected to the lever 135 at one end and at its opposite end has an adjustable connection 138 with a bell crank lever 139. The bell crank 139 is suitably mounted for pivoted movement within the frame 20 and is adapted to engage a pin 140 extending radially outward from a shaft 141, which shaft is suitably journalled adjacent its opposite ends and mounted on the wall 119 of the frame 20 by suitable brackets 142. The shaft 141 adjacent its lower end carries a crank arm or lever 143, substantially identical to the lever 123, which is adapted to engage and actuate the plate 122 of the cam 72. Thus, the cam 72 will be moved into the path of rotation of the cam follower 67a of the plate gripper means 57 at the appropriate time in the cycle of plate and platen cylinder rotation.

In use and operation, the old or used plate is first stripped from the plate segment 55, in the manner described hereinbefore, and thereafter the machine, or at least the blanket 51, is cleaned. After cleaning, it is necessary to attach a new plate to the plate segment 55. To accomplish this function, the machine operator places the new plate on the feed table and moves the handle 136 upwardly to the dotted line position shown in Figure 9. As the lever 135 is moved, the roller 134 engages the left side of the lever 101 to move the lever 101 into connected engagement with the lever 131 and to disconnect levers 98 and 101. At the same time, the link 137 effects actuation of the bell crank lever 139 to impart pivotal movement to the shaft 141 and the crank arm or lever 143 to move the cam 72 into the path of rotation of the cam follower 67a of the gripper means 57. Accordingly the cam 72 will be adapted for actuation of the gripper means 57 in properly timed sequence with the actuation of the feed means, through the follower 130, so as to feed the fresh plate to the plate surface 55 of the cylinder 48 in the same manner as sheets of paper are fed to the platen surface 54. After the new plate has been fed to the plate segment 55, as is readily observed by movement of the plate through the rollers 112 and 113, and the appearance of the plate on the cylinder 48, the handle 136 is returned to its normal position, whereupon the spring 103 will disconnect the levers 101 and 131 and effect a connection between the levers 98 and 101 to again dispose the apparatus in position for normal operation of the paper feed and stripping means as has been described hereinbefore.

From the foregoing, it will be appreciated that the present invention provides a substantial advantage in convenience of operation in that the operation of sheet feeding and plate changing is entirely within the control of the operator of the machine without any necessity for stopping the machine or for the operator changing position and wherein the operation is simplicity itself. In addition, the sheets of paper are fed into a delivery chute that is readily visible from the operator's normal operating position and the plates after use are automatically fed onto the stack of sheets of paper printed from that plate, whereby the plates may automatically serve as separators or indicators between the various types of printed matter that are automatically stacked in the delivery chute as the machine is operated. Accordingly, the bracket 78 defines a common delivery or stripping station, the table 116 comprises a common feeding station and the rollers 112 and 113 and associated apparatus comprise a common paper and plate gripping and advancing means in the printing machine. The advantages of such common means, in both economy and efficiency, is obvious.

Referring now to Figure 3, a particular arrangement of the segment cylinder 48, the blanket cylinder 51, and the feed means are shown wherein the disposition and arrangement of the parts is such as to provide maximum accessibility to the machine for the purposes of cleaning, adjustment and repair. As will be appreciated, vertical and horizontal lines may be passed through the axis of the plate and platen cylinder shaft 49, which vertical and horizontal lines define four quadrants, namely, an upper right hand quadrant I, an upper left hand quadrant II, a lower left hand quadrant III, and a lower right hand quadrant IV. To provide for maximum accessibility, it has been found that the blanket cylinder 51, which is tangent to the cylinder 48, should have its line of tangency with the segment cylinder lying within the upper 45° of the upper left hand quadrant II. In other words, the blanket 51 should be so disposed that a radius of the shaft 49 passing through the point of tangency between the two cylinders will lie between zero and 45° to the left of the vertical line or axis and to the upper side of the cylinder 48. For maximum accessibility, it has been found that the blanket 51 should be tangent to the plate and platen cylinder at a line 20° from the vertical axis in quadrant II. With respect to the feeding means, it has been found that best accessibility is obtained if the feed means is such as to feed the paper and/or plates to the plate and platen cylinder at a point lying within the area between 45° above the horizontal axis in the upper right hand quadrant I and 20° below the horizontal axis in the lower right hand quadrant IV. In other words, as long as the paper feed is disposed within the 65° angle defined, ready accessibility to the machine for cleaning, adjustment and repair is provided. For maximum accessibility, the feed means should be so arranged as to feed paper and/or plates to the segment cylinder at a point on the segment cylinder lying 26° above the horizontal line or axis in quadrant I. With the utilization of the preferred angles described, the machine will be arranged for optimum mounting of the various operating and control mechanisms thereof and at the same time will be so constituted as to provide for ready access and for all of the advantageous functions referred to herein.

As has been briefly referred to hereinbefore, it is customary and necessary to clean the blanket upon each change of printing plate, so as to avoid any carry-over of printing matter from the former plate. According to the present invention, means are provided, under the manual control of the machine operator, for effectively cleaning the blanket without any necessity for the operator changing position from in front of the feed table. The blanket cleaning means of the present invention, as shown in Figure 3, includes a transverse rod 144 extending between and supported at its opposite ends by the side frames 20 and 21 immediately to the rear of the blanket cylinder 51. The rod 144 is adapted for the detachable connection thereto of a blanket cleaner, indicated generally at 145. The blanket cleaner 145 comprises a generally box-like metallic housing 146 and a scraper, wiper, or sponge 147 mounted within the housing with the forward portion thereof projecting from the housing for engagement with the blanket surface. As shown, the scraper or wiper sponge 147 is mounted in the upper portion of the housing 146 so as to leave a space 148 at the bottom of the housing which is adapted for the reception and collection of the scrapings from the blanket 51. At the lower end thereof, the housing 146 is provided with a plurality of longitudinally spaced spring fingers 149 adapted to be pressed upon the shaft or rod 144 to provide a readily detachable support for the blanket cleaner 145. As will also be appreciated, the spring fingers 149 serve to mount the blanket cleaner 145 on the rod 144 for pivotal movement with respect to the rod and the blanket surface. To actuate the blanket cleaner 145 into and out of engagement with the blanket, a lever 150 is provided having a readily detachable connection (not shown) with the side wall of the housing 146. The lever 150 is pivotally connected at one end thereof to a rod 151 which extends toward the forward or feed side of the machine. Adjacent the inclined front wall of the side frame, the rod 151 is pivotally connected to one end of a lever 152 which is secured to a shaft extending through the inner wall of the side frame, which shaft, within the frame, carries a handle 153 projecting exteriorly of the front inclined wall of the side frame for ready manual actuation. As will be appreciated, the lever 152 and handle 153 in effect comprise a bell crank. To normally bias the blanket cleaner 145 out of engagement with the blanket 51, a tension spring 154 is connected between a pin or the like on the side wall of the housing and the pivotal connection between the rod 151 and the lever 152. To actuate the blanket cleaner 145, it is merely necessary to exert a downward pull on the handle 153 to move the scraper or wiper sponge 147 into engagement with the surface of the blanket. The housing 146 and scraper 147 are of substantially the same length as the blanket so that the entire surface of the blanket may be rapidly and effectively cleaned by the scraper or wiper. As will be appreciated, material scraped or wiped from the surface of the blanket will be accumulated within the space 148 in the housing 146. To clean this material out of the housing, it is merely necessary to grasp the housing 146 and remove the same from the rod 144 and the lever 150. As will be appreciated, the detachable connections provided between the rod 144 and the housing and between the lever 150 and the housing accommodate ready removal of the blanket cleaner 145 for cleaning thereof.

The shaft 52, on which the blanket cylinder 51 is rotatably mounted, was briefly described hereinbefore as being journalled at its opposite ends in the side frames 20 and 21, and the ring gear 50 was referred to as being journalled on the shaft 50a and connected to the cylinder 51. In actual construction, the arrangement is such as to accommodate swinging movement of the blanket cylinder 51 relative to the plate and platen cylinder 48, while the ring gears 47 and 50 remain meshed, as will now be described with reference to Figures 10 to 14. The primary purpose of the movable blanket is to provide for separation of the printing couple, that is, disengagement of the plate and platen surfaces and the blanket, when there is a failure of paper feed to the platen surface, thus to avoid the possibility of ink being transferred by the blanket directly to the platen surface, which ink would later be transferred to or smeared upon the back side of sheets of paper to be subsequently printed. Accordingly, it will be appreciated that the means for moving the blanket will be under the control of means disposed adjacent the paper feed for determining or detecting the presence or absence of a sheet of paper at the paper feeding cycle in machine operation.

As shown in Figures 1 and 10, the blanket cylinder 51 is journalled on its shaft 52 and the shaft 52 is provided at the opposite ends thereof with eccentric stub shafts 155 which are journalled in bearings in the side frames 20 and 21. At the side frame 20, the stub shaft 155 is journalled in the stationarily mounted shaft 50a. As will be appreciated, movement of the blanket about the axis of the stub shafts 155 will effect movement of the axis of the shaft 52 so as to move the blanket away from the segment cylinder. The ring gear 50 is rotatably mounted on the shaft 50a so that the same has a fixed meshed relation with the plate and platen cylinder gear 47. The gear 50 has driving connection by means of a crank 50b (see Figure 2) with the blanket cylinder 51, the crank 50b being pivotally connected to the gear at one end and to the cylinder at its other end. Thus, the gear will continuously transmit rotary force to the blanket cylinder, whether the cylinder be axially aligned with the gear or offset with respect thereto. The blanket cylinder stub shaft 155 disposed adjacent and journalled in the right side frame 21 is adapted to carry a first plate or lever 156 which is journalled on the shaft 155 and a second plate or lever 157 which is fixed to the shaft 155 and connected, at one end thereof, to the first plate 156 by means of an adjustable screw and slot connection 158. The first plate or lever 156 is normally biased by means of a spring 159 in such direction as to swing the blanket 51 about the axis of the stub shafts 155 to move the blanket 51 away from the plate and platen cylinder 48. The adjustable connection 158 accommodates calibration or setting of the blanket-to-plate and platen cylinder impression pressure, as will become apparent as the description proceeds. To prevent movement of the blanket 51 away from the segment cylinder 48 under the urge of the spring 159, a normally engaged latch 160 is provided which latch is adapted for engagement with the opposite or lower end of the second plate 157. The latch 160 preferably comprises an abutment portion or projection provided on a lever or arm 161. At one end thereof, the lever 161 is pivotally connected to one end of a link or bracket 162 which is pivotally mounted at its opposite end to the side frame 21. The lever 161 is normally biased by means of a spring 163, which is substantially stronger than the spring 159, into engagement with the lever or plate 157 to retain the blanket 51 in its normal position.

To trip the latch 160 at an appropriate time in the cycle of operation of the machine, paper sensing or detecting means is provided at the feeding station of the machine, that is, adjacent the feed rollers 112 and 113. As is shown in Figure 13, the lower serrated drive roller 113 is preferably formed of relatively short segments, with the segments being mounted upon the shaft 37 in spaced relation. Within the spaces provided between the segments of the drive roller 113, latch members or levers 164 are mounted, the same having arcuate or curved portions adapted to fit about the shaft 37, but being movable with respect to the shaft 37. The latch members 164 each include an upwardly projecting extension terminating adjacent, but radially inwardly of, the periphery of the roller segments 113. At their lower ends, the latch members 164 are each connected to a shaft 166 by means of a suitable bracket 167. The shaft 166 is journalled at its opposite ends in the side frames 20 and 21 and adjacent the right side frame 21 carries a lever 168 which is rotatably mounted thereon. At its outer end, the lever 168 is pivotally connected to one end of a link or connecting lever 169, which at its opposite end is pivotally connected to the latch lever 161. A radially outwardly extending pin 170 is secured to the shaft 166, and a similar pin, projecting in the same direction, is secured adjacent the outer end of the lever 168. A tension spring 172 is connected between the pins 170 and 171. In the normal position of the various components of the sensing or detecting apparatus, the spring 172 does not exert a downwardly pulling force on the outer end of the lever 168. However, when the shaft 166 is rotated, or given a partial rotation, the pin 170 is moved in such direction as to tension the spring 172, thereby exerting a downward pulling force on the pin 171 which results in the application of a biasing force on the lever 168 tending to pivot the lever about the shaft 166 for movement in a downward arc to trip the latch 160 through the link 169 and lever 161.

For effecting movement of the shaft 166 in a direction to exert a downward pulling force on the lever 168, a plurality of detecting or sensing feelers or fingers 173 are provided, which fingers are adapted for cooperation with the extensions 165 of the latch members 164. Each of the detecting fingers 173 extends into the space provided between adjacent roller segments 113 and is fixed at its rearward end on a shaft 174. The shaft 174 is pivotally supported by a plurality of crank arms 175 which are secured to and supported by a cross shaft 176 extending between and journalled in the side frames 20 and 21. As is clearly shown in Figure 13, the shaft 176 extends through the side wall of the right side frame 21 and within the interior of the side frame 21 is provided with a crank arm 177 secured to the shaft 176. As will be apparent, movement transmitted to the crank arm 177 will result in pivoting of the shaft 176 to move the shaft 174 and the fingers 173 backwardly and forwardly over the feed roller 113. For the purpose of normally supporting the detecting fingers 173, shelf portions or surfaces 178 are provided on the plate or guide 114, which shelves extend into the spaces between the roller segments 113. In the normal position thereof, the free outer ends of the detecting fingers 173 rest upon the shelves 178. When a sheet of paper is fed between the feeding rollers 112 and 113, the same will engage at least one of the detecting fingers 173, whereupon the fingers 173 will all be swung upwardly and at least one of the fingers will rest lightly upon the paper, as shown in Figure 14, so that the fingers are prevented from falling within the space between the roller segments 113. Accordingly, it will be appreciated that when a sheet of paper is being fed to the machine, the sensing or detecting fingers 173 will be incapable of engaging the extensions 165 of the latches 164. However, when a sheet of paper is not fed to the machine at the appropriate time, the fingers 173, which normally rest on the shelves 178, will be moved forwardly by means to be described immediately hereinafter, whereupon the fingers will enter into the spaces between the roller segments 113 and into engagement with the extensions 165 of the latches 164. As the fingers 173 engage the extensions 165, the latches 164 will be moved, as is shown in Figure 12, to impart a partial rotation to the shaft 166. As the shaft 166 is rotated, the pin 170 will be swung in such direction that the spring 172 will exert a downwardly biasing force on the lever 168 whereby an unlatching bias will be exerted upon the latch lever 161.

The means for effecting actuation of the detecting fingers 173 at an appropriate time in the cycle of machine operation comprises a link 179 connected at one end to the crank arm 177 and connected at its opposite end to one end of a lever 180. The lever 180 is pivotally mounted intermediate its ends on the side wall of the right side frame 21 and at its lower end carries a roller or cam follower 181 which is normally biased by a spring 182 into engagement with a cam 183 carried by the segment cylinder shaft 49 within the interior of the right side frame. As shown, the cam 183 includes a camming portion adapted, approximately at the time the feed roller 112 is actuated, to effect actuation of the lever 180. In particular, the cam 183 includes a raised portion adapted to move the lower end of the lever 180 radially outwardly of the cam 183 so that the link 179 and crank arm 177 will be moved to the left as the same are viewed in Figures 10, 12, 13 and 14. As the crank arm 177 is moved to the left, rotary movement will be imparted to the shaft 176 to swing the crank arms 175 in a forwardly and downwardly direction so as to move the shaft 174 and detecting fingers 173 forwardly with respect to the feed rollers 112 and 113. If a sheet of paper 60 is being fed by the rollers 112 and 113 at that time, the fingers 173 will ride harmlessly upon the sheet 60 and will not engage or actuate the latch members 164, as is clearly shown in Figure 14 and as was described hereinbefore. However, if there is no sheet of paper being fed to the machine at that time, the fingers 173 will be driven forwardly off of the shelves 178 and into engagement with the extensions 165 of the latch members 164, as is shown in Figure 12 and as has been described hereinbefore. Accordingly, when a sheet of paper is not fed to the machine at the proper time, the latches 164 will be actuated to effect an exertion of an unlatching bias on the latch lever 161.

However, the force exerted by the spring 172 will not be sufficient to trip the latch 160 due to the frictional engagement between the latch 160 and the plate or lever 157. To provide means for alleviating the frictional resistance to unlatching, a cam 184 is disposed within the right side frame 21 and is mounted upon the shaft 49 of the plate and platen cylinder for effecting actuation of a cam follower 185 mounted upon the lower end of a lever 186, which lever is biased by a spring 187. The lever 186 is pivotally mounted on the side frame intermediate its ends and at its upper end is provided with a head 188 including an adjustable stud 189 adapted for engagement with a crank arm 190 carried by the eccentric stub shaft 155 of the blanket cylinder 51. The cam 184 is so shaped as to impart to the lever 186 such movement at such time as to bias the blanket into firmer engagement with the segment cylinder 48 which will alleviate the frictional resistance between the latch 160 and the lever 157, whereupon the spring 172 is adapted to move the latch 160 out of the path of movement of the lever 157. Thereafter, the spring 159 will take effect to pivot the blanket 51 about the axis of the stub shafts 155 and swing the blanket out of engagement with the segment cylinder so that when the platen segment passes adjacent the blanket 51, ink will not be transferred to the platen surface. The spring 187 normally biases the stud 189 into engagement with the crank arm 190 to prevent a hammer-like effect when the cam 184 actuates the lever 186.

Resetting of the apparatus after the latch 160 has been tripped and the blanket 51 has been swung out of its normal position is accomplished automatically upon the next cycle of operation of the machine, unless there is again a failure of paper feed. The reset cycle is as follows: When the follower 181 again engages the base circle portion of the cam 183, the detecting fingers 173 are withdrawn to release the latch members 164. At this time, the spring 172 is effective to return the latch members 164 and the latch member 160 to their normal positions. If paper is fed at the proper time thereafter, the latch members 164 will not be actuated and will not condition the spring 172. Thus, the latch 160 will be disposed to catch the plate 157 upon the following actuation of the lever 186. As the lever 186 moves the crank arm 190, the plate 157 and the blanket 51 back toward normal position, the plate 157 will engage the inclined rear surface of the latch 160 to cam the same out of its path as accommodated by the spring 172. However, after the plate 157 passes over the latch, the spring 172 will move the latch back into the path of movement of the plate 157 to catch the plate and retain the same in normal position. Thus, the machine will be reset for normal operation.

Due to the arrangement of the gear 50 with respect to the shaft 52 and the stub shaft 155, the predetermined rotational relationship between the cylinders 48 and 51 will be retained and both cylinders will have normal rotation even though the printing couple is disconnected.

As was pointed out hereinbefore, all the necessary components of the printing machine must be under the control of the machine operator from his or her normal operating position at the machine. As will be apparent from the foregoing, the operator of the machine will have active control of the machine so that all necessary machine operations can be performed from a position in front of the feed table of the machine. In addition to the foregoing controls, it is necessary that the machine operator have full control of the apparatus for inking and dampening the printing plate carried by the plate segment 55. Preferred inking and dampening means, which constitute the subject matter of our copending divisional application, Serial No. 417,273, filed March 19, 1954, are disclosed herein in Figures 15 to 17. Referring now to Figure 15, we have shown the inking and dampening rollers and the drive means therefor in phantom lines and the mechanism for controlling the inking and dampening rollers in solid lines. As shown in phantom lines, the drive gear 39 effects rotation, in the manner described hereinbefore, of the ink distributing roll 43 and the dampening fluid distributing roll 46. Referring to the inking assembly, at the right side of the figure, the roller 43 is mounted upon a shaft 42 journalled in the side frames 20 and 21 and this shaft provides a pivotal mounting for a frame or bracket 191 which rotatably supports an inking form roll 192 which is adapted to engage the periphery of the plate and platen cylinder 48. The inking form roll 192 is in peripheral engagement with the roller 43 so that the same is driven and has ink transferred thereto by the roller 43. The frame 191 includes an outwardly extending arm 193, at the free end of which a stud or screw 194 is adjustably mounted for a purpose to be described hereinafter. The inking assembly also includes a ductor roll 195, the purpose and operation of which will be described hereinafter.

The dampening apparatus is substantially identical to the inking apparatus and includes the distributing roll 46 mounted on the shaft 45, a frame or bracket 196 pivoted on the shaft 45, a dampening form roll 197 journalled in the frame 196, the frame including an arm 198 carrying an adjusting stud or screw 199, and a dampening ductor roll 200. The inking and dampening form rolls 192 and 197 are normally biased into engagement with the peripheral surface of the plate and platen cylinder by means of a spring 201 extending between the supporting frames for the two rolls.

Referring now to the apparatus for controlling inking and dampening, which apparatus is disposed within the right side frame 21, the present invention provides selectively operable on and off controls for the inking and dampening rollers and selectively operable means for controlling the amount of inking and dampening. The ink on-off control comprises a lever 202 disposed in the upper portion of the side frame 21 and pivotally mounted on a cross shaft 203. The lever 202 at one end thereof projects to the exterior of the inclined front face of the side frame 21 and at that point is provided with a handle 204 for manual actuation. At its opposite end, the lever 202 is pivotally connected to one end of a link or connecting lever 205 which is pivotally connected at its opposite end to a crank arm or lever 206 which is secured to a shaft 207 for oscillating the shaft. The shaft 207 may merely be mounted and journalled in the side frame 21, or the same may extend between the side frames and be journalled adjacent each end in the frames. At the portion thereof adjacent the stud 194 on the frame 191, the shaft 207 is provided at one side thereof with a flatted portion arranged to be engaged by the stud 194 mounted on the frame 191 of the inking form roll 192. Due to the bias of the spring 201, the stud 194 will engage the shaft 207. When the stud 194 engages the flatted portion of the shaft 207, as is shown in Figure 15, the adjustment of the stud is such that the inking form roll 192 will engage the peripheral surface of the plate segment 55 to ink the plate carried by the segment. However, when the shaft 207 is oscillated to bring the cylindrical portion thereof into engagement with the stud 194, the stud 194 will be moved outwardly to pivot the frame 191 about the shaft 42 to swing the inking form roll 192 away from the segment cylinder 48, whereby inking will be stopped or turned off. Accordingly, the flatted shaft 207 comprises cam means for on-off control of the inking form roll. As will be apparent from Figures 1 and 15, the on-off inking control is so arranged that the handle 204 is moved downwardly to the on position and is moved upwardly to the off position.

The on-off dampening control is substantially identical to the on-off inking control and includes a bell crank 208 pivotally mounted on the shaft 203 and having a handle 209 (see Figure 1) lying behind the handle 204 in Figure 15. The inner end of the bell crank 208 is pivotally connected to a link or connecting lever 210 which is pivotally connected at its lower end to a crank arm or lever 211 secured to a shaft 212 identical to the shaft 207 and comprising cam means adapted for cooperation with the stud 199 carried by the frame 196 of the dampening form roll 197. The operation of the on-off dampening control is the same as that described hereinbefore with respect to the on-off inking control.

As is clearly shown in Figure 1, the on-off inking and dampening control handles 204 and 209, respectively, are conveniently disposed for ready access by the operator so that the inking and dampening operations may be readily turned on or off, selectively, by the operator without any necessity for change of position.

The means for controlling the amount of inking and/or dampening is shown in Figures 15 to 17, wherein the inking control includes a flow selector lever 213 pivotally mounted on a cross shaft 214 and having a handle portion 215 extending to the exterior of the inclined front wall of the right side frame 21. At its inner end, the lever 213 includes a toothed sector 216 adapted for cooperation with a spring finger 217, whereby a ratchet arrangement is provided for retaining the lever 213 in any position to which the same is adjusted. Operation of the selector lever handle 215 between the solid and dotted line positions thereof, as shown in Figure 15, provides full range control of the amount of fluid applied to the form roll. A linking rod 218 is pivotally connected at its upper end to the sector 216 of the lever 213 and at its lower end is pivotally connected to a bell crank lever 219 which is pivotally mounted on a cross shaft 220 within the side frame 21. The opposite end of the bell crank 219 is pivotally connected to a link 221 which is pivotally connected to the arm of a control cam 222 which is pivotally mounted on the shaft of a ink pickup or fountain roll 223. The purpose of the cam will become apparent in the following description of the corresponding dampening fluid control.

The dampening fluid control is substantially identical to the inking control and includes a lever identical to the lever 213 pivoted on the shaft 214 and terminating at its outer end in a handle 224 (see Figure 1) disposed behind the lever and handle 213, 215 in Figure 15. The dampening control lever is pivotally connected to a linking rod that is identical to the rod 218 and that is pivotally connected at its lower end to a bell crank 225 pivotally mounted on the shaft 220. The bell crank 225 is pivotally connected to one end of a link 226 which is connected at its opposite end to a lever 227 pivotally mounted within the side frame 21. The lever 227 is pivotally connected to a link or connecting rod 228 which is pivotally connected at its opposite end to the arm of a dampening solution control cam 229. Referring to Figures 16 and 17, the control cam comprises a crank arm or lever embodying a peripheral surface defined by different radii taken from a common center so that the periphery of the same assumes a cam surface. The cam 229 is mounted on a bearing which is journalled on the shaft 230 of a dampening solution pickup or fountain roll 231. Secured to the shaft 230 of the dampening fluid fountain roll 231 is a ratchet wheel 232. In addition, a lever 233 is pivotally mounted on the bearing on the shaft 230 of the roll 231 and the lever carries a pawl 234 having a pivotal mounting thereon. A suitable spring 235 is associated with the pawl 234 for normally biasing the same in the direction of the ratchet 232. The pawl 234 includes a pawl arm 236 extending parallel to the axis of the fountain roll 231 and adapted for cooperation with the ratchet 232 and also with the cam 229. The cam 229 presents an outer circular surface having a diameter greater than that of the ratchet 232, but the cam is stepped, as at 237, to expose portions of the toothed periphery of the ratchet 232 for engagement by the pawl. In use, the lever 233 is oscillated, by means to be described hereinafter, to impart oscillating movement to the pawl 234. As the lever 233 is oscillated, the ratchet 232 and the pawl 234 comprise a one-way clutch or drive means between the lever 233 and the fountain roll 231, whereby rotary movement in one direction is imparted to the fountain roll by the oscillating lever. The control cam 229 provides means for varying the rotary movement imparted to the fountain roll on each oscillation of the lever 231, thus to vary the amount of fluid picked up by the fountain roll for transfer, by the ductor and distributing rolls, to the form roll 197, as will become apparent in the following description of the operation of the flow selector controls.

As viewed in Figure 16, upon clockwise movement of the lever 233, the pawl arm 236 will ride freely over the surface of the ratchet 232, due to the inclination of the teeth of the ratchet and will ride over the face 237 of the cam 229 and onto the outer circular surface of the cam wherein the pawl cannot engage the ratchet. Upon counterclockwise movement of the lever 233, the pawl arm 236 will ride upon the circular surface of the cam 229 until the same passes over the step 237 of the cam, at which time the pawl arm will be biased into engagement with the teeth of the ratchet 232 by the spring 235. Continued counterclockwise movement of the lever 233 will then impart driving movement to the ratchet wheel 232 and the serrated dampening fountain roll 231. The lever 233 has a predetermined and fixed path of oscillation and, accordingly, it will be appreciated that the position of the cam 229 will control the amount of rotation of the fountain roll 231 and thus the amount of fluid pickup for transfer to the dampening fluid ductor roll 200. To oscillate the lever 233, a link 238 is provided which is pivotally connected at one end to the crank 233 and at its opposite end is pivotally connected to the shaft of the plate and platen cylinder 48 eccentrically of the axis of rotation of the cylinder.

The means for controlling the amount of inking is substantially the same as the means for controlling the amount of dampening. In particular, the inking control means includes a pawl 239 pivotally mounted on a lever 240, which lever is pivotally connected to one end of a link 241, which link is pivotally connected at its opposite end to the link 238 and eccentrically of the axis of rotation of the plate and platen cylinder 48.

Referring again to Figure 15, the means for driving the ductor rolls 195 and 200 includes a bracket 242 for supporting the ink ductor roll 195, the bracket 242 being pivotally mounted on the side frame 21, a crank arm 243 secured to the bracket 242 for oscillating the same, about its pivotal mounting between the fountain roll and the distributing roll, a link or lever 244 pivotally connected at one end to the crank arm 243 and at its opposite end to a lever 245, which lever is pivotally connected to an identical second lever 246, a second link or lever 247 pivotally connected at one end to the lever 246, a crank arm 248 pivotally connected to the opposite end of the link 247, and a bracket 249 pivotally mounted on the side frame 21 for supporting the dampening fluid ductor roll 200, the crank arm 248 being connected to the bracket 249 for oscillating the same between the fountain roll and the distributing roll. In use, the levers 245 and 246, or the pivotal connections between the levers 244 and 245 and the levers 246 and 247, comprise cam followers arranged to engage a cam 250 carried by the shaft of the segment cylinder 48, the followers being biased into engagement with the cam 250 by means of springs 243a and 248a, respectively. The cam 250 is so shaped as to impart reciprocatory movement to the links or levers 244 and 247 whereby the brackets 242 and 249 and the ductor rolls 195 and 200 will be oscillated between their fountain rolls 223 and 231, respectively, and their distributing rolls 43 and 46, respectively.

When the machine is operated, the ink and dampening solution controls are turned on by moving the control handles 204 and 209 to their lowermost positions. Thereafter, the amount of ink and/or dampening fluid applied to the plate surface is controlled by suitable adjustment of the handles 215 and 224. Then, as the plate and platen or segment cylinder 48 is rotated, and the transfer rolls 43 and 46 are rotated, all through the gear 39, the inking and dampening form rolls 192 and 197, respectively, will be suitably driven to apply dampening fluid and ink to the plate segment 55 of the cylinder 48. The cam 250 imparts oscillatory movement to the ductor rolls 195 and 200, so that the same are moved between their respective fountain and distributing rolls. At the same time, the eccentric mounting of the links 238 and 241 will result in imparting partial rotations to the fountain rolls 223 and 231 so that fluid will be present on the surface thereof to be picked up by the ductor rolls 195 and 200, respectively. After picking up fluid from the rolls 223 and 231, the respective ductor rolls will transfer the same to the distributing rolls 43 and 46, respectively, whereupon the fluids will be transferred to the form rolls 192 and 197, respectively, and thus will be applied to the surface of the plate segment 55.

As will be obvious, fluids should not be applied to the platen segment 54 and to prevent the possibility of such application, the segment cylinder 48 is provided with a half moon cam 251 which is substantially coextensive with the platen segment 54 and is adapted to engage the inking and dampening form rolls 192 and 197, respectively, during passage of the platen segment 54 thereover so as to bias the rollers 192 and 197 out of engagement with the platen surface. In actual construction, the cam 251 engages suitable discs or the like, not shown, carried at the ends of the form rolls to prevent contact between the form rolls and the platen surface. It is this same half-moon cam that is employed for engaging the roller 92 to impart biasing pressure to the paper stripping rollers 87.

In addition to the control apparatus described hereinbefore, one of the side frames, preferably the left side frame 20, may suitably house an indicator or counter 252, suitably driven in any customary manner, for automatically maintaining a count of the sheets of paper printed by the apparatus. If desired, the counter 252 may include suitable reset means for setting the indicator to zero at the time printing plates are changed so that an accurate count of the sheets of paper printed from a single plate may be kept.

Referring now to Figure 1, the machine is shown with some portions thereof removed so as to clearly show the arrangement of the gripping fingers, the plate and platen cylinder and the blanket cylinder. The complete construction of the machine will be readily apparent to those skilled in the art from the foregoing description. In a practical commercial embodiment, the frame may include housing members so that the paper and plate feeding means will be enclosed within a suitable cover, with a slot being provided in the front wall of the cover to provide access for the feeding of sheets of paper to the feed rollers 112 and 113. Specifically, referring to Figure 3, it is preferred that a cover be provided on the front wall 253 and the horizontal wall 254 at the feed side of the machine to enclose the paper and plate feeding means, and the gripping means at the time of passage adjacent the feeding means. A feed slot will be provided in the cover on the wall 253 in alignment with the feed table 116.

In use and operation of the machine, the operator will sit or stand at the feed side of the machine immediately in front of the feed table 116 so that sheets of paper stacked on the feed table may readily be fed, one at a time, either manually or automatically, into the machine. All of the controls for the machine are disposed within ready access of the machine operator without the necessity for the operator moving from his or her position in front of the feed table 116. Specifically, the operator of the machine, who may be either male or female, has the motor switch and the plate removing and changing controls readily accessible at the left hand, and has the blanket cleaning means and the inking and dampening control means readily accessible at the right hand. To operate the machine, the motor 25 is started by flipping the switch 26 on. After the machine has been started, the first operation required is to secure a printing plate to the plate surface 55 of the segment cylinder 48. To accomplish this, the machine operator moves the handle 136 upwardly, places the fresh printing plate on the feed table 116 and manually feeds the plate through the slot in the front wall of the machine. The operator will then observe that the sheet does not pass entirely within the machine, but is stopped by means, the stop fingers 115, within the machine. Thereafter, the operator will observe that the printing plate is pulled into the machine as the fingers 115 are lowered and the feed rolls energized. When the printing plate has passed into the machine from the feed table 116, the operator returns the handle 136 to its down position. Thereafter, by glancing at the segment cylinder 48, which is directly within view, the operator will observe that the printing plate is secured to the plate segment. The operator will now turn the dampening on-off control lever 209 to on position and will set the dampening flow selector control 224 to approximately a mid point on its scale. Thereafter, the inking control is turned on in much the same manner.

After the printing plate has been fed to the machine, and the inking and dampening controls have been turned on, the operator commences feeding sheets of paper one at the time to the machine. As pointed out, the operator will be able to feed a single sheet of paper only a limited distance into the machine manually and thereafter the machine will take over automatically to feed the sheet of paper at the proper time in the operating cycle of the machine. However, the operator will see the sheets of paper on the plate segment of the cylinder 48 as the same passes his or her line of vision and, as the printed sheets are discharged into the delivery box or tray 86, the operator will be able to observe the printed sheet to ascertain whether more or less ink or more or less dampening solution is required. As will be apparent, the machine operator has selective control of inking and dampening within ready reach of his or her right hand and during the complete operation of printing, is able to vary the inking and dampening at various times as may be required. After the machine has been set in operation as described, it is merely a matter of feeding sheets of paper one at a time to the machine in a constant or consistent manner so as to maintain a supply of paper for printing. As the individual sheets of paper are fed to the machine and printed, the counter 252 will tabulate and total the number of sheets fed to and printed by the machine.

In actual operational detail, the foregoing operations performed by the machine operator result in the following mechanical movements. As the switch 26 is turned on, the motor 25 is energized to drive the pulley 29 and all of the drive train members associated therewith. Specifically, the inking and dampening gears 41 and 44 are driven, the feed drive roller 113 is driven through the pulley 36, the plate and platen cylinder 48 is rotated through the ring gear 47 and the blanket 51 is rotated through its ring gear 50. To affix a printing plate to the segment cylinder, the operator moves the handle 136 upwardly which results in the roller 134 establishing connection between the levers 101 and 131, see Figure 9, and a disconnection of the levers 98 and 101. At the same time, the cam 72 is moved into the path of the cam follower 67a of the plate gripper means 57. As the plate gripper means 57 rotates into general alignment with the feed table 116, the cam 72 effects opening movement of the gripper means and the cam 95 effects actuation of the lever assembly 131, 101, 102, 104, 106, 109 and 111 to move the upper feed roller 112 into pressure engagement with the lower feed roller 113 whereupon the plate previously positioned between the rollers is automatically fed between the now open fingers 58 and 59 and into engagement with the stop 63 associated therewith. Thereafter, and during continued feed of the printing plate, the cam follower 67a rides off of the cam 72 to close the gripper fingers 58 and affix the printing plate to the anvil surface of the plate surface 55 of the segment cylinder 48. When the machine operator originally feeds the printing plate to the machine, the fingers 115 carried by the shaft 107 are projected into the path of the plate to prevent full manual introduction of the plate into the machine. As was pointed out hereinbefore, the fingers 115 are removed from the path of travel of the plate immediately prior to the establishment of feeding pressure between the rollers 112 and 113. After the printing plate has been fed to the machine, the operator returns the handle 136 to its down position which removes the cam 72 from the path of rotation of the cam follower 67a and, accordingly, the printing plate will be affixed to the plate segment 55 for continued rotation within the machine. The movement of the control lever 136 to its down position further effects a change in the timing of the feed rollers 112 and 113, as has been pointed out hereinbefore.

When the machine operator moves the inking and dampening control handles 204 and 209, respectively, to their on positions, in the proper order as stated hereinbefore, the shafts or cam means 207 and 212, respectively, are rotated by their associated linkages to move the flatted portions of the respective shafts into alignment with the studs 194 and 199, respectively, carried by the frame work for the inking and dampening form rollers 192 and 197, respectively, so that the inking and dampening rollers are disposed for engagement with the plate carried on the plate surface 55. As pointed out hereinbefore, the half moon cam 251 will prevent engagement of the rollers 192 and 197 with the platen surface 54. Adjustment of the amount of inking and dampening, through the medium of the control handles 215 and 224, respectively, will result in operation of the control cams 222 and 229 to expose more or less of the surface of the ratchets 232 for engagement by the pawls 234 and 239, whereby a desired rotation of the fountain rolls 223 and 231, respectively, is established to effect the transfer of a determined amount of fluid to the respective form rolls 192 and 197, as has been described with respect to Figures 15, 16 and 17.

After the inking and dampening controls have been turned on, sheets of paper are fed to the machine by feeding the same one at a time through the slot in the front wall of the machine from the feeding table 116. As a sheet of paper is fed into the machine, the fingers 115 are disposed in the path of the sheet to stop the same with a portion of the sheet disposed between, but not driven by, the feeding rollers 112 and 113. As the paper gripping means 56 are moved into general alignment with the feeding table 116, the cam follower 67 engages the cam 72 to be actuated to open position thereby. At the same time, the cam 95 accommodates such movement of the cam follower 97 as to impart movement, due to the spring 99, to the linkage 98, 101, 102, 104, 106, 109 and 111 to move the upper feed roller 112 into pressure engagement with the lower feed roller 113 so that the feed roller 113 drives the paper forwardly, the stop fingers 115 having been removed from the path of the sheet of paper, into the now open paper gripping means and into engagement with the stop or abutment 63 of the gripping fingers 58. Thereafter, the cam follower 67 passes over the cam 72 so that the forward edge of the sheet of paper is gripped between the fingers 58 and the anvil surface 61 of the paper segment 54. As the segment cylinder 48 rotates, dampening fluid and ink are applied to the plate attached to the segment 55 by the rollers 197 and 192, respectively. Thereafter, the plate passes in engagement with the blanket 51 so that the ink is transferred from the plate to the blanket. Since the blanket 51 is half the size of the segment cylinder 48, nearly the full area thereof will be covered by the impression from the plate. Thereafter, the sheet of paper fed to the paper segment will pass between the segment cylinder and the blanket 51 and the ink impression on the blanket will be transferred to the paper. After the forward portion of the sheet of paper has been printed, the cam follower 67 of the paper gripping means 56 will engage the cam 73 whereupon the gripping fingers will be opened and the ejecting fingers will elevate the leading edge of the sheet. At the same time, the half moon cam 251 will be in engagement with the roller 92 so that the stripper rollers 87 are moved into firm engagement with the sheet of paper to hold the sheet in registry on the platen surface. The leading edge of the sheet of paper will then engage the stripper plate or bracket 78 so that the forward edge of the sheet of paper is guided into the bite of the rollers 79 and 80. The spring 84 exerts a bias on the roller 80 holding the same in firm engagement with the roller 79. The roller 79 is suitably driven from the electric motor 25 so that the same will grasp the paper and move the same upwardly over the lip 85 and into the delivery box or tray 86. During this operation, the plate carried by the plate segment 55 will again be dampened and inked by the rollers 197 and 192, respectively. Thereafter, the half moon cam 251 will move the dampening and inking rollers 197 and 192, respectively, away from the segment cylinder so that fluid is not applied to the platen surface 54. The platen surface then again moves into alignment with the feed table 116, during the time that the ink is being transferred from the plate to the blanket 51, and a second sheet of paper is fed to the segment cylinder, whereupon the hereinbefore described operation is repeated.

As each sheet of paper is fed to the machine, the paper detecting fingers 173 are actuated by the cam 183 carried by the shaft 49 of the segment cylinder 48, so that at each time the upper feed roller 112 is actuated, the fingers 173 are moved forwardly. If a sheet of paper is present, the operation will be exactly as described hereinbefore, the fingers 173 riding harmlessly on the top of the sheet. However, if the operator has failed to feed a sheet of paper to the machine at that time, it is desirable to disconnect or separate the printing couple so as to avoid the application of ink to the surface of the platen segment 54. In operation, if a sheet of paper is not fed to the machine at the appropriate time, the fingers 173 will engage the extensions 165 of the latches 164 to apply a bias to the spring 172 tending to trip the latch 160, see Figure 10. The cam 184, also carried by the shaft 49, then actuates the cam follower 185 to apply a friction releasing bias to the eccentric shafts 155 of the blanket 51 so that if an unlatching bias is exerted on the latch 160, the same will be free to become unlatched. If the latch 160 is tripped by the spring 172, the spring 159 will take over to pivot the blanket 51 away from the segment cylinder 48 due to the disposition of the eccentric shafts 155 of the blanket 51. If the blanket is tripped or released, due to failure of paper feed, the same is automatically reset by the lever 186 on the next cycle of machine operation during which paper is fed.

While the springs 163 and 159 have been referred to hereinbefore exclusively for the purpose of providing means for releasing the blanket 51 from engagement with the segment cylinder 48, it is also to be pointed out that the spring 159 and 163 will accomodate yielding of the blanket 51 with respect to the segment cylinder 48 to accommodate the passage of thick or crumpled sheets of paper through the machine.

When the desired number of sheets have been printed from a single printing plate, and it is desired to change the plate so as to run a second printing plate, the operator flips the inking and dampening on-off control handles 204 and 209 to their off positions and presses the button 129. As the button 129 is depressed, the cam 73 is moved into the path of rotation of the cam follower 67a of the plate gripper means 57. Thereafter, as the cam follower 67a engages the cam 73, the gripping fingers 58 of the gripping means 57 are moved to open position and the ejector fingers 59 are actuated to elevate the leading edge of the plate for engagement with the stripper bracket 78 so that the plate will be automatically fed by the rollers 79 and 80 into the delivery tray 86. Thereafter, that is, as soon as the operator sees the printing plate delivered into the box 86, the control button 129 is released to accommodate return of the cam 73 to its normal position. The operator then moves the blanket cleaner control handle 153 downwardly to move the scraper or wiper 147 into engagement with the blanket 51. As the wiper 147 engages the blanket, the ink and ink impression left on the blanket is quickly and rapidly removed therefrom, the ink being accumulated in the collecting chamber 148 of the blanket cleaner housing 146. After the blanket has been cleaned, as may readily be observed by the operator since the blanket is directly within his or her line of view, the control lever 153 is released, whereupon the spring 154 will return the lever 153 and the blanket cleaner 145 to normal position. The operator then moves the plate attaching control lever 136 upwardly and feeds a new plate to the machine in the manner described hereinbefore. After the new printing plate has been fed to the machine, the lever 136 is returned to its normal position. Thereafter, the inking and dampening control levers 204 and 209, respectively, are returned to their on positions and paper is fed to the machine in the manner described to run off the desired copies of the second printing plate. As pointed out hereinbefore, the counter 252 may include suitable reset means so that the counter may be set for zero at the start of printing with each printing plate.

To stop operation of the machine, it is merely necessary to turn the ink and dampening solution controls 204 and 209 off and to turn the switch 26 to its off position. However, it is preferable to clean the machine before stopping the same and to this end, it is preferred that paper feed be stopped, that ink and dampening be turned off, that the printing plate be removed from the plate segment, and that the blanket cleaner 145 be applied to the blanket to clean the same. Prior to cleaning, the ink and dampening fluid are turned off before the blanket cleaner is applied to the blanket cylinder and the flow selector controls 215 and 224 are returned to zero setting so as to avoid accidental application of ink or dampening fluid should one of the controls 204 or 209 be accidentally moved to on position. After the inking and dampening controls have been moved to off position, the blanket has been cleaned and all of the controls have been returned to their normal positions, the operation of the machine may be stopped merely by turning the switch 26 to its off position.

From the foregoing, it will be apparent that the present invention provides an improved printing machine particularly well adapted for systems duplicating and the like wherein the entire operation of the machine may be controlled from a single position by a single operator, and wherein automatic changing of the printing plates may be readily and conveniently accomplished. The invention provides several novel features, among which are: paper and plate feed from a common station and in a common manner; automatic gripping means associated with both the plate and platen cylinders; novel paper and plate gripping and releasing means; continuous operation of the machine, even during plate changing; remote controls for operating instrumentalities; novel remote controls for the inking and dampening apparatus; novel blanket cleaning means; novel plate and paper feeding means and timing change means therefor; and disposition of the machine components for maximum accessibility. The machine is particularly adapted for continuous operation and the operator is not required to change position, yet during such continuous operation a large number of printing masters, as many as several hundred in a continuous operation, may be duplicated in large quantities. Accordingly, it will be appreciated that the features briefly referred to combine to create a printing machine having a speed, efficiency, simplicity and continuity of operation heretofore unknown.

Hereinbefore, the machine of the present invention has been described with respect to a preferred embodiment comprising an offset press. However, the present invention is not limited in application to offset printing, but has particular applicability to letter press and direct lithographic printing as well. The machine described hereinbefore is well adapted to the latter types of printing by slight modification of the cylinders 48 and 51 to provide a plate cylinder and an impression cylinder. If the modified machine is to be used permanently as a letter press or for direct lithographic printing, the cylinder 48 may be made of the same size as the cylinder 51 and the plate gripping and changing means may be eliminated. In such case, the cylinder 48 would be adapted to have a direct printing plate secured thereto and would be equipped with a single gripping means, a paper gripper, to clamp paper to the plate so that the paper would be fed between the bite of the cylinders 48 and 51 to be printed directly from the plate. As a further modification, the machine described hereinbefore may be modified so that the platen segment could be removed to accommodate the attachment of a direct printing plate to the plate and platen cylinder, whereby the single machine would be adapted for both direct and offset printing. Other similar modifications of the machine of the present invention will readily suggest themselves to those schooled in the art.

Figure 4A:
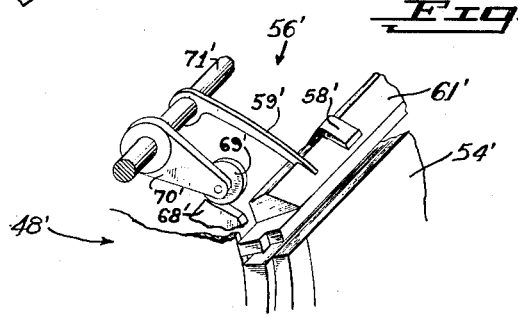
Figure 4A is a view similar to Figure 4 of a second embodiment of the invention.

In either of the modifications expressly defined in the above paragraph, the paper gripping means and associated apparatus are retained in the machine. As will be appreciated this apparatus includes the anvil 61. To retain the anvil, and at the same time to accommodate attachment of direct printing plates to the cylinder 48 and/or the attachment and removal of printing plates and the platen segment, a second embodiment of the invention is disclosed in Figure 4A. The apparatus shown in Figure 4a is substantially identical to the apparatus shown in Figure 4, common primed reference numerals being utilized in Figure 4a to indicate the same or similar parts, with the exceptions that the anvil 61' is formed separately of the platen segment 54' and the segment 54' is removably mounted on the cylinder 48' to accommodate removal and replacement of the same. Accordingly, direct printing plates may be substituted for the segment 54'. For machines adapted for permanent direct printing, the member 54' is a printing plate or a bed for the plate. The anvil 61' is preferably permanently associated with the cylinder 48' and the gripping means 56'.

When the embodiment of the invention shown in Figure 4A is used for direct printing, the half-moon cam 251 is not employed so that ink may be applied to the printing plate. If the structure of Figure 4A is used in the offset press shown in the other figures, so that a printing plate occupies the normal position of the platen segment, the half-moon cam 251 is removed from its usual position adjacent the platen segment and is preferably associated with the plate segment to prevent the application of fluid to the plate segment during direct printing.

While it would be possible, in adapting the offset press to direct printing, to substitute a printing plate for the plate segment 55, it is preferred to substitute the same for the platen segment 54 for the reason that there is then no necessity for making adjustments in the paper feeding and detecting means. All that is required, in addition to substitution of a printing plate for the platen segment, is a rearrangement of the half-moon cam 251.

From the foregoing, it will be appreciated that the present invention not only provides an improved offset press having the numerous advantages pointed out hereinbefore, but that the invention also provides a machine adapted for direct printing having many of the advantages pointed out hereinbefore, particularly as regards speed, convenience and ease of operation, coupled with continuous operation from a single control station. Furthermore, the present invention provides a machine adapted for either direct or offset printing wherein the change from one type of printing to the other is readily and easily accomplished.

In view of the above, it will be appreciated that the machine of the present invention meets all of the specifications set forth hereinbefore and provides novel capabilities heretofore unattained in the art.

While preferred embodiments of the invention have been described hereinbefore, it will be apparent to those skilled in the art that various changes, rearrangements and modifications may be made therein without departing from the scope of the invention, as defined by the appended claims.

What is claimed is:

1. A printing machine comprising, in combination, a movable platen surface, a movable plate surface, a movable blanket surface adapted to engage said plate and platen surfaces, said surfaces having a predetermined cycle of movement, a common feed station adjacent said plate and platen surfaces, normally closed gripping means associated with each of said plate and platen surfaces at the forward side thereof in the direction of movement of said surfaces, cam means adjacent said feed station for actuating said gripping means, said cam means normally being disposed outside the path of movement of the gripping means associated with said plate surface and in the path of movement of the gripping means associated with said platen surface, means for moving said cam means into the path of movement of the gripping means associated with said plate surface, said gripping means upon engagement with said cam means being actuated to open position upon passage of the respective surface past said station, common feed means for feeding paper to said platen surface and printing plates to said plate surface at said feed station, said feed means comprising paper and plate gripping and advancing means operated in sequence with and during engagement of said gripping means with said cam means, said feed means including actuating means responsive to movement of said cam means normally to effect paper feeding in sequence with engagement of the gripping means associated with said platen surface with said cam means, said actuating means of said feed means being responsive to movement of said cam means to change the timing of said feed means operation to correspond to actuation of the gripping means associated with said plate surface upon engagement of that gripping means with said cam means, a blanket surface cleaner and actuating means therefor, plate surface inking and dampening means and actuating means therefor, said inking and dampening actuating means, said blanket surface cleaner actuating means, and said means for moving said cam means all including actuating members extending adjacent said feed station for manual actuation at said station, and drive means including control means disposed adjacent said feed station for effecting said predetermined cycle of movement of said surfaces.

2. A printing machine as set forth in claim 1, wherein said plate and platen surfaces each comprise approximately one-half the circumference of a common cylinder and wherein said blanket surface comprises a cylinder having a circumference approximately one-half that of said plate and platen cylinder, said blanket cylinder normally engaging said plate and platen cylinder tangent thereto, the line of tangency between said plate and platen cylinder and said blanket cylinder lying within an arc of 45° from a vertical line passing through the axis of said plate and platen cylinder and to the upper side of said plate and platen cylinder, said feed station and said feed means being positioned to feed paper and printing plates to said plate and platen cylinder at a line lying within an arc of from 20° below a horizontal line passing through the axis of said plate and platen cylinder to 45° above said line and at the side of said plate and platen cylinder opposite the side of said vertical line to which said first arc of 45° extends.

3. In a printing machine, in combination, a rotatable plate and platen cylinder, a rotatable blanket cylinder normally engaging said plate and platen cylinder, a feeding station adjacent said plate and platen cylinder to the forward side of said blanket cylinder in the direction of rotation of said plate and platen cylinder, a stripping station adjacent said plate and platen cylinder to the opposite side of said blanket cylinder, the line of engagement between said cylinder lying within an arc of 45° from a vertical line passing through the axis of said plate and platen cylinder and to the upper side of said plate and platen cylinder, said feeding station being positioned to feed sheets of paper and printing plates to said plate and platen cylinder at a point lying within an arc of from 20° below a horizontal line passing through the axis of said plate and platen cylinder to 45° above said line and at the side of said plate and platen cylinder opposite the side of said vertical line to which said first arc of 45° extends, said plate and platen cylinder including circumferentially spaced plate and platen segments, the spaces between said segments being peripherally open and diametrically opposed, gripping means mounted on said plate and platen cylinder in the spaces between said segments and each including an anvil surface adjacent the leading edge surface of the respective segment, and a plurality of spaced gripping fingers normally engaging said surface, a pair of cams mounted respectively adjacent said feeding and stripping stations exteriorly of said plate and platen cylinder, said cams normally being disposed to actuate the fingers of the platen segment gripping means to accommodate feeding and stripping of sheets of paper to and from said platen segment at said feeding and stripping stations respectively, said cams being selectively operable to effect actuation of the plate segment gripping means to facilitate feeding and stripping of printing plates to and from said plate segment at said feeding and stripping stations respectively, and common feed means comprising a pair of rolls, one power driven and the other mounted for movement toward said one roll, a spring actuated linkage operatively associated with said other roll for biasing said other roll into engagement with said one roll, a cam mounted on said plate and platen cylinder, a pair of followers engaging said cam at diametrically spaced points and selectively connectable with said linkage, one of said followers normally being connected to said linkage, said last-named cam normally rendering said linkage ineffective and being so constructed and arranged as to release said one follower when said feeding station cam actuates said platen segment gripping means to accommodate pressure engagement between said rolls, and means responsive to operation of said feeding station cam to disconnect said one follower from and to connect the other to said linkage.

4. In a printing machine as set forth in claim 3, an inking roll adapted to engage said plate segment, a dampening roll adapted to engage said plate segment, cam means for each of said last-named rolls accommodating engagement of said rolls with said plate segment and operable to move said rolls away from said plate segment, and second cam means associated with each of said rolls and operable to vary the amount of fluid applied to said plate segment, said cam means and the gripping means actuating cams each including operating instrumentalities extending adjacent said feeding station.

5. In a printing machine as set forth in claim 4, a wiper for cleaning the surface of said blanket cylinder and actuating means therefor, said actuating means including actuating instrumentalities extending adjacent said feeding station.

6. In a printing machine, a platen surface, a plate surface, a blanket surface adapted for engagement with said plate and platen surfaces, said surfaces having a predetermined cycle of movement, common feeding and stripping stations adjacent said plate and platen surfaces, gripping means associated with each of said plate and platen surfaces, each gripping means including an anvil surface adjacent the leading edge portion of the respective one of said plate and platen surfaces, gripping fingers and ejector fingers normally engaging the anvil surface, a pair of shafts mounted for movement with the respective surface and for rotation with respect thereto, said gripping fingers being mounted on one shaft and said ejector fingers being mounted on the other shaft, a cam follower on said one shaft and motion transmitting means between said shafts for imparting movement of the one shaft to the other shaft, cam means adjacent each of said stations for actuating the cam followers of said gripping means, said cam means normally being disposed outside the path of movement of the cam follower of the plate surface gripping means and in the path of movement of the cam follower of the platen surface gripping means, said cam means being selectively movable into the path of movement of the cam follower of the plate surface gripping means, said cam followers upon engagement with said cam means being actuated to rotate said one shaft and thus said other shaft to move said fingers to open position upon passage of the respective surface past the respective station, and common feed means comprising a pair of rolls, one power driven and the other movable toward said one roll, means for biasing said other roll into engagement with said one roll, cam controlled means operatively associated with said biasing means and a cam operated in sequence with the cycle of movement of said surfaces, said cam cooperating with said controlled means normally to render said biasing means ineffective, said cam at a predetermined portion of the cycle of movement of said surfaces accommodating movement of said cam controlled means to release said biasing means whereupon said means biases the said other roll into engagement with said one roll, said cam controlled means including a pair of cam followers engaging said cam at spaced points and means for selectively establishing operative connection between each of said cam followers and said biasing means, said last-named means being operatively associated with the cam means adjacent said feed station for moving that cam means into the path of movement of the cam follower of the plate surface gripping means, whereby the timing of biased engagement between said rolls may be changed to correspond to actuation of the respective gripping means at the feeding station.

7. In a printing machine, a platen surface, a plate surface, a blanket surface adapted for engagement with said plate and platen surfaces, said surfaces having a predetermined cycle of movement, a common feeding station adjacent said plate and platen surfaces, gripping means associated with each of said plate and platen surfaces, each of said gripping means including an anvil surface adjacent the leading edge of the respective plate and platen surfaces, a plurality of gripping fingers and a plurality of ejector fingers normally engaging the anvil surface and compound cam means including a cam follower for actuating said fingers, selectively operable cam means adjacent said feeding station disposed in the path of movement of the cam follower of the platen surface gripping means for actuating that gripping means during each cycle of movement of said surfaces, said cam means being operable at selected times for disposition in the path of movement of the cam follower of the plate surface gripping means, said cam followers upon engagement with said cam means being actuated to move said fingers to open position upon passage of the respective surface past said station, and common feed means comprising a pair of rolls one power driven and the other movable toward said one roll, means for biasing said other roll into engagement with said one roll and cam means operable in sequence with the cycle of movement of said surfaces normally rendering said biasing means ineffective and accommodating release of said biasing means at a predetermined portion of the cycle of movement of said surfaces, the last-named cam means normally accommodating release of said biasing means at that portion of the cycle of movement of said surfaces wherein the cam follower of the platen surface gripping means engages the first-named cam means, and means responsive to operation of said first-named cam means to change the sequence of release of said biasing means by said last-named cam means, said biasing means upon operation of said first-named cam means being released by said last-named cam means at that portion of the cycle of movement of said surfaces wherein the cam follower of the plate surface gripping means engages said first-named cam means, whereby the timing of biased engagement between said rolls with respect to the cycle of movement of said surfaces may be changed to accommodate feeding of paper to said platen surface and feeding of printing plates to said plate surface at different times in the cycle of movement of said surfaces.

8. In a printing machine, a platen surface, a plate surface, a blanket surface adapted for engagement with said plate and platen surfaces, said surfaces having a predetermined cycle of movement, a common feeding station adjacent said plate and platen surfaces, normally closed gripping means associated with each of said plate and platen surfaces, cam means adjacent said feeding station for actuating said gripping means, each of said gripping means including a cam follower adapted for engagement with said cam means, gripping fingers directly associated with said cam follower and ejector fingers indirectly associated with said cam follower, said cam means including portions disposed in the path of movement of the cam follower of the platen surface gripping means and portions selectively movable and into and out of the path of movement of the cam follower of the plate surface gripping means, the latter portion of said cam means normally being disposed outside the path of movement of the cam follower of the plate surface gripping means, said cam followers upon engagement with said cam means being actuated to move said fingers to open position upon passage of the respective surface past said feeding station, and common feed means for feeding paper and plates to said platen and plate surfaces respectively, said feed means normally being inoperative, means normally rendering said feed means operative upon engagement of the cam follower of the platen surface gripping means with the first-named portion of said cam means, and control means operatively associated with the second-named portion of said cam means and responsive to movement thereof into the path of movement of the cam follower of the plate surface gripping means for changing the timing of operation of said feed means to correspond with engagement of the cam follower of the plate surface gripping means with said cam means.

9. In a printing machine, a rotatable plate and platen cylinder, common feeding and stripping stations adjacent said cylinder, said cylinder including a pair of spaced end plates and a plate segment and a platen segment mounted in circumferentially spaced relation on said end plates, the spaces between said segments being peripherally open, a pair of gripping means mounted on said cylinder in the spaces between said segments, said gripping means each including a pair of shafts journalled in said end plates and extending longitudinally of said cylinder in spaced parallel relation adjacent the respective peripheral opening, one of said shafts including a portion extending beyond one end of said end plates, a cam follower secured to said extending portion of said one shaft, a cam on said one shaft between said end plates, a cam follower on the other of said shafts adapted for cooperation with said cam on said one shaft, a plurality of spaced gripping fingers mounted on said one shaft, and a plurality of spaced ejector fingers mounted on said other shaft, an anvil surface at the leading edge of each of said segments, said fingers extending through said peripheral opening and normally engaging said anvil surface, the cam follower of the gripping means associated with said platen segment being of greater extent longitudinally of said cylinder than the cam follower of the gripping means associated with said plate segment, and a pair of cams mounted exteriorly of said cylinder in the path of rotation of the cam follower of said platen gripping means, said cams being mounted respectively adjacent said feeding and stripping stations, said cams being mounted for movement longitudinally of said cylinder into and out of the path of rotation of the cam follower of the plate gripping means, said cam adjacent said feeding station normally being adapted to actuate said cam follower of said platen gripping means to open the fingers thereof to accommodate the feeding of a sheet of paper to said fingers and to close said fingers whereby the same hold the sheet of paper to said platen segment, said cam adjacent said stripping station normally being adapted to actuate said cam follower of said platen gripping means to release and elevate the leading edge of the sheet of paper held thereby whereby the same may be stripped from the platen segment, said cams each being adapted to be moved into the path of rotation of the cam follower of said plate gripping means to facilitate feeding and stripping of printing plates to and from said plate segment at said feeding and stripping stations respectively in the same manner as paper is fed to and stripped from said platen segment.

10. In a printing machine a rotatable plate and platen cylinder, a feeding station adjacent said cylinder, said cylinder including a pair of spaced end plates and a plate segment and a platen segment mounted in circumferentially spaced relation on said end plates, the spaces between said segments being peripherally open, a pair of gripping means mounted on said cylinder in the spaces between said segments, said gripping means each including a pair of shafts journalled in said end plates and extending longitudinally of said cylinder in spaced parallel relation adjacent the respective peripheral opening, one of said shafts including a portion extending beyond one of said end plates, a cam follower secured to said extending portion of said one shaft, motion transmitting means between said shafts between said end plates, a plurality of spaced gripping fingers mounted on said one shaft, a plurality of spaced ejector fingers mounted on said other shaft, an anvil surface at the leading edge of each of said segments, said fingers extending through said peripheral opening and normally engaging said anvil surface, a spring between said one shaft and said cylinder normally biasing said gripping fingers into engagement with said anvil surface, and a cam normally disposed in the path of rotation of the cam follower of the gripping means associated with said platen segment, said cam being mounted adjacent said feeding station and normally actuating said cam follower of said platen gripping means to open the fingers thereof to accommodate feeding of a sheet of paper to said fingers and to close said fingers whereby the same will hold a sheet of paper to said platen segment, said cam being mounted for movement into the path of rotation of the cam follower of said plate gripping means to actuate the last-named cam follower and facilitate feeding of printing plates to said plate segment at said feeding station in the same manner as paper is fed to said platen segment, said cam followers upon engagement with said cam each effecting rotation of said one shaft in the direction to move said gripping fingers away from said anvil surface, said motion transmitting means between said shafts upon rotation of said one shaft rotating said other shaft a limited degree with respect to the rotation of said one shaft to move said ejector fingers away from said anvil surface.

11. In a printing machine, a platen surface, a plate surface, said surfaces having a predetermined cycle of movement, a common feed station adjacent said surfaces, gripping means associated with each of said surfaces, each of said gripping means including a plurality of gripping fingers and a plurality of ejector fingers, an anvil surface at the leading edge of the respective one of the plate and platen surfaces, said fingers normally engaging the anvil surface, a pair of shafts mounted for movement with the respective surface and for rotation with respect thereto, said gripping fingers being mounted on one of said shafts and said ejector fingers being mounted on the other, motion transmitting means between said shafts for imparting movement of one shaft to the other shaft and cam follower means on said one shaft, and cam means mounted exteriorly of said surfaces adjacent said feed station for actuating said cam follower means, said cam means being mounted for movement from a normal position outside the path of movement of the plate surface gripping means and in the path of movement of the platen surface gripping means to a position in the path of movement of the plate surface gripping means, said cam follower means of said gripping means upon engagement with said cam means being actuated to rotate said one shaft and thusly said other shaft to move said fingers away from the anvil surface upon passage of the respective surface past said station.

12. In a printing machine, a platen surface, a plate surface, said surfaces having a predetermined cycle of movement, a feed station adjacent said surfaces, gripping means associated with each of said surfaces, each of said gripping means including cam follower means for effecting actuation thereof, and a cam mounted exteriorly of said surfaces adjacent said feed station for actuating said cam follower means of both of said gripping means, said cam normally being disposed in the path of movement of the gripping means associated with said platen surface and being mounted for movement into and out of the path of movement of the gripping means associated with said plate surface, said cam being mounted for movement at a fixed location in the path of movement of said surfaces with respect to said feed station to actuate at said location said cam follower means of both of said gripping means as said gripping means approach and pass said feed station, said cam follower means of said gripping means upon engagement with said cam being actuated to open said gripping means associated with the respective surface upon passage of the respective surface past said station, whereby both printing plates and paper are fed to said surfaces from a single feed station.

13. In a printing machine, a rotatable plate and platen cylinder, a feeding station adjacent said cylinder, said cylinder including a plate segment and a platen segment, a pair of gripping means mounted on said cylinder, said gripping means each including normally closed gripping fingers and cam follower means for actuating said fingers, one gripping means being disposed adjacent the leading edge of said plate segment and the other gripping means being disposed adjacent the leading edge of said platen segment, a cam adjacent said feeding station disposed in the path of rotation of the cam follower means of the platen gripping means, said cam being mounted for movement into and out of the path of rotation of the cam follower means of the plate gripping means, said cam normally being adapted to actuate said cam follower means of said platen gripping means to open the fingers thereof to accommodate feeding of a sheet of paper to said fingers and to close said fingers whereby the same hold the sheet of paper to said platen segment, said cam being adapted to be moved into the path of rotation of the cam follower means of said plate gripping means to facilitate feeding of printing plates to said plate segment at said feeding station, and common feed means at said station comprising a pair of rolls having the bite therebetween aligned with said feeding station, one of said rolls being power driven and the other of said rolls being mounted for movement toward and away from said one roll, means biasing said other roll into engagement with said one roll, cam controlled means operatively associated with said biasing means and a cam driven by said cylinder, said cam cooperating with said cam controlled means normally to render said biasing means ineffective, said cam at a predetermined portion of the cycle of rotation of said cylinder accomodating movement of said cam controlled means to release said biasing means whereupon said means biases said other roll into engagement with said one roll, said cam controlled means including a pair of cam followers engaging said cam at spaced points and means for selectively establishing operative connection between each of said cam followers and said biasing means, said last-named means being operatively associated with the first-named cam to effect movement of said cam, whereby the timing of biased engagement between said rolls with respect to the cycle of rotation of said cylinder is timed according to whichever of the gripping means is to be actuated by said first-named cam.

14. In a printing machine, a platen surface, a plate surface, said surfaces having a predetermined cycle of movement, a common feeding station adjacent said surfaces, normally closed gripping means associated with each of said surfaces at the leading edge thereof, cam means adjacent said feed station for actuating said gripping means, said cam means being disposed in the path of movement of the platen surface gripping means and being movable into and out of the path of movement of the plate surface gripping means, said gripping means upon engagement with said cam means being actuated to open position upon passage of the respective surface past said station, common feed means for feeding paper to said platen surface and printing plates to said plate surface, means operated in sequence with the predetermined cycle of movement of said surfaces for rendering said feed means ineffective, said last-named means normally being rendered inoperative during engagement of the platen surface gripping means with said cam means whereby said feed means is adapted to feed sheets of paper to said platen surface when the platen surface gripping means are open, and means operatively associated with said cam means and with said last-named means for varying the cycle of operation of said feed means to correspond with the period during which the plate surface gripping means is actuated to open position by said cam means.

15. In a printing machine, a rotatable plate and platen cylinder, a rotatable blanket cylinder normally engaging said plate and platen cylinder and tangent thereto, a common feeding station adjacent said plate and platen cylinder to the forward side of said blanket cylinder in the direction of rotation of said plate and platen cylinder, the line of tangency between said blanket cylinder and said plate and platen cylinder lying within an arc of 45° from a vertical line passing through the axis of said plate and platen cylinder and to the upper side of said plate and platen cylinder, said feeding station being positioned to feed paper and printing plates to said plate and platen cylinder at a line lying within an arc of from 20° below a horizontal line passing through the axis of said plate and platen cylinder to 45° above said line and at the side of said plate and platen cylinder opposite the side of said vertical line to which said first arc of 45° extends, said plate and platen cylinder including a plate segment and a platen segment, a pair of gripping means mounted on said plate and platen cylinder, said gripping means each including normally closed gripping fingers and cam follower means for actuating said fingers, one of said gripping means being disposed adjacent the leading edge of said plate segment and the other of said gripping means being disposed adjacent the leading edge of said platen segment, and a cam normally disposed in the path of rotation of the cam follower means of the platen gripping means, said cam being mounted adjacent said feeding station and normally actuating said cam follower means of said platen gripping means to open the fingers thereof to accommodate feeding of a sheet of paper to said fingers and to close said fingers whereby the same hold the sheet of paper to said platen segment, said cam being mounted for movement into the path of rotation of the cam follower means of the plate gripping means to actuate the last-named cam follower means and facilitate feeding of printing plates to said plate segment at said feeding station in the same manner as paper is fed to said platen segment.

16. In a printing machine, a rotatable plate and platen cylinder, common feeding and stripping stations adjacent said cylinder, said cylinder including a plate segment and a platen segment mounted in circumferentially spaced relation on the periphery of said cylinder, a pair of gripping means mounted on said cylinder in the spaces between said segments, said segments each having a gripping means associated with the leading edge thereof, said gripping means each including gripping fingers and a cam follower extending longitudinally outward from said cylinder, the cam follower of the platen gripping means being of a greater extent longitudinally of said cylinder than the cam follower of the plate gripping means, and a pair of cams mounted exteriorly of said cylinder in the path of rotation of the cam follower of said platen gripping means, said cams being mounted respectively adjacent said feeding and stripping stations and being mounted for movement longitudinally of said cylinder into and out of the path of rotation of the cam follower of said plate gripping means, said cams normally being adapted to actuate the cam follower of said platen gripping means and being adapted to be moved into the path of rotation of the cam follower of said plate gripping means to facilitate feeding and stripping of sheets of paper and printing plates to and from said segments respectively, at said feeding and stripping stations respectively.

17. In a printing machine, a rotatable plate and platen cylinder, common feeding and stripping stations adjacent said cylinder, said cylinder including a plate segment and a platen segment, a pair of gripping means mounted on said cylinder, said gripping means each being associated with one of said segments and each including gripping fingers and cam follower means for actuating said fingers, and a pair of cams disposed in the path of rotation of the cam follower means of the platen segment gripping means, said cams being mounted respectively adjacent said feeding and stripping stations and being mounted for movement into and out of the path of rotation of the cam follower means of the plate segment gripping means, said cams normally being adapted to actuate said cam follower means of said platen gripping means to accommodate feeding and stripping of sheets of paper to and from said platen segment at said feeding and stripping stations respectively, said cams being adapted to be moved into the path of rotation of the cam follower means of said plate gripping means to facilitate the feeding and stripping of printing plates to and from said plate segment at said feeding and stripping stations respectively in the same manner as paper is fed to and stripped from said platen segment.

18. In a printing machine, a rotatable plate and platen cylinder, a feeding station adjacent said cylinder, said cylinder including a plate segment and a platen segment, a pair of gripping means mounted on said cylinder, said gripping means each including gripping fingers and cam follower means for actuating said fingers, one of said gripping means being associated with the forward side of said plate segment in the direction of rotation of said cylinder, the other of said gripping means being associated with the forward side of said platen segment, and a cam normally disposed in the path of rotation of the cam follower means of the platen gripping means, said cam being mounted adjacent said feeding station and normally actuating said cam follower means of said platen gripping means to open the fingers thereof to accommodate feeding of a sheet of paper to said fingers and to close said fingers whereby the same hold the sheet of paper to said platen segment, said cam being mounted for movement into the path of rotation of the cam follower means of the plate gripping means to actuate the last-named cam follower means and facilitate feeding of printing plates to said plate segment at said feeding station in the same manner as paper is fed to said platen segment.

19. In a printing machine, a platen surface, a plate surface, said surfaces having a predetermined cycle of movement, a single feeding station and a single stripping station adjacent said surfaces, gripping means associated with each of said surfaces and each including gripping fingers and cam follower means for actuating said fingers, cam means adjacent each of said stations for actuating said follower means of both of said gripping means, said cam means being normally disposed in the path of movement of the follower means of the platen surface gripping means, and being mounted for selective movement into and out of the path of movement of the follower means of the plate surface gripping means, said cam means each being mounted for movement at a fixed location in the path of movement of said surfaces with respect to the respective one of said stations to actuate at the respective location said follower means of both of said gripping means as said gripping means approach and pass the respective station, said follower means upon engagement with said cam means actuating the fingers of the respective gripping means to open position upon passage of the respective surface past the respective station, whereby both printing plates and paper are fed to said surfaces from a single feeding station and stripped from said surfaces at a single strippining station.

20. In a printing machine, a platen surface, a plate surface, said surfaces having a predetermined cycle of movement, a feed station adjacent said surfaces, normally closed gripping means associated with each of said surfaces, and cam means adjacent said feed station for actuating said gripping means, said cam means including portions normally disposed in the path of movement of the platen surface gripping means and portions mounted for movement into and out of the path of movement of the plate surface gripping means, the latter portions of said cam means being mounted for movement at a fixed location in the path of movement of said surfaces with respect to said feed station to actuate at said location both of said gripping means as said gripping means approach and pass said feed station, said gripping means upon engagement with said cam means being actuated to open position upon passage of the respective surface past said station, whereby both printing plates and paper are fed to said surfaces from a single feed station.

21. In a printing machine, a rotatable cylinder comprising a pair of spaced end plates and peripheral segments mounted on said plates, said segments being so mounted as to provide at least one longitudinally extending peripheral opening, a pair of shafts journalled in said end plates and extending longitudinally of said cylinder in spaced parallel relation adjacent said peripheral opening, one of said shafts including a portion extending beyond one of said end plates, a cam follower secured to the extending portion of said one shaft, a cam on said one shaft between said end plates, a cam follower on the other of said shafts adapted for cooperation with said cam on said one shaft, said one shaft including a portion of square cross section between said end plates, a plurality of spaced gripping fingers mounted on said square portion of said one shaft and extending through said peripheral opening in said cylinder, an anvil surface adjacent said peripheral opening, said gripping fingers normally engaging said anvil surface, a spring between said one shaft and said cylinder normally biasing said gripping fingers into engagement with said anvil surface, a stop member on each of said gripping fingers extending inwardly with respect to said cylinder, a plurality of spaced ejector fingers mounted on said other shaft intermediate said gripping fingers and extending through said peripheral opening, said ejector fingers normally engaging said anvil surface, said anvil surface having recesses therein for the normal reception of said ejector fingers, and cam means mounted independently of said cylinder in the path of rotation of said cam follower on said one shaft as said cylinder is rotated, said cam follower on said one shaft being actuated upon engagement with said cam means to rotate said one shaft in a direction to move said gripping fingers away from said anvil surface, said cam on said one shaft upon rotation of said one shaft actuating said cam follower on said other shaft to rotate said other shaft a limited degree with respect to the rotation of said one shaft to move said ejector fingers away from said anvil surface.

22. In a printing machine, a movable printing surface, an anvil at the leading end portion of said surface, a pair of shafts mounted for movement with said surface and for rotation with respect thereto, said shafts extending across the width of said surface in spaced parallel relation adjacent said anvil, one of said shafts including a portion extending beyond one side of said surface, a cam follower secured to said extending portion of said one shaft, a cam on said one shaft, a cam follower on the other of said shafts engaging said cam on said one shaft, a plurality of spaced gripping fingers mounted on said one shaft, a plurality of spaced ejector fingers mounted on said other shaft, said fingers normally engaging said anvil, and cam means mounted to said one side of said surface to be engaged by said cam follower on said one shaft as said surface is moved, said cam follower on said one shaft being actuated upon engagement with said cam means to rotate said one shaft in the direction to move said gripping fingers away from said anvil, said cam on said one shaft upon rotation of said one shaft actuating said cam follower on said other shaft to rotate said other shaft to move said ejector fingers away from said anvil, said cam and said cam follower having cocoperating surfaces providing a delay action response on the part of said cam follower to movement of said cam and moving said cam follower a limited amount with respect to the movement of said cam, whereby said ejector fingers are moved away from said anvil after and to a lesser extent than said gripping fingers.

23. In a printing machine, a movable printing surface, an anvil adjacent the leading edge portion of said printing surface, a plurality of gripping fingers normally engaging said anvil, a plurality of ejector fingers normally engaging said anvil, a pair of shafts mounted for movement with said printing surface and for rotation with respect thereto, said gripping fingers being mounted on one of said shafts and said ejector fingers being mounted on the other of said shafts, motion transmitting means between said shafts for effecting conjoint rotation of said shafts, and means mounted independently of said surface for oscillating said one shaft at at least one point in the path of movement of said printing surface to open and close said fingers, said motion transmitting means including cooperating members providing a delay action response of said other shaft to initial rotation of said one shaft in a direction to open said fingers and limiting rotation of said other shaft with respect to said one shaft, said members upon reverse rotation of said one shaft to close said fingers immediately rotating said other shaft, whereby said ejector fingers are opened after and to a lesser extent and closed before said gripping fingers.

24. In a printing machine, a rotatable plate and platen cylinder and common means for feeding paper to the platen surface and printing plates to the plate surface of said cylinder, said means comprising a feeding station, a pair of rolls having the bite therebetween aligned with said station, one of said rolls being power driven and the other of said rolls being mounted for movement toward said one roll, a spring actuated linkage operatively associated with said other roll for biasing said other roll into engagement with said one roll, a cam mounted on said cylinder, said linkage including a pair of followers engaging said cam at spaced points and a spring biased link normally connected to one of said followers and the remainer of said linkage, said cam normally rendering said linkage ineffective to bias said other roll into engagement with the said one roll, said cam being so constructed and arranged as to release said one follower at a predetermined portion of the cycle of rotation of said cylinder to accommodate pressure engagement between said rolls, and an actuating member operatively associated with said spring biased link adapted to disconnect said one follower from and to connect the other follower with the remainder of said linkage, whereby the timing of biased engagement between said rolls is changed with respect to the normal timing.

25. In a printing machine, a platen surface, a plate surface, said surfaces having a predetermined cycle of movement, and common means for feeding paper to said platen surface and printing plates to said plate surface, said means comprising a pair of rolls, one of said rolls being power driven and the other of said rolls being mounted for movement toward said one roll, means for biasing said other roll into engagement with said one roll, cam controlled means operatively associated with said biasing means and a cam operated in sequence with the cycle of movement of said surfaces, said cam cooperating with said cam controlled means normally to render said biasing means ineffective, said cam at a predetermined portion of the cycle of movement of said surfaces accommodating movement of said cam controlled means to release said biasing means, said cam controlled means including a pair of cam followers engaging said cam at spaced points and means or selectively establishing operative connection between each of said cam followers and said biasing means, whereby the timing of biased engagement between said rolls with respect to the cycle of movement of said surfaces may be changed to accommodate feeding of paper to said platen surface at predetermined portions of the cycle of movement of said surfaces and feeding of printing plates to said plate surface at other predetermined portions of the cycle of movement of said surfaces.

26. In a printing machine as set forth in claim 23, a carrier for said printing surface, said anvil and said shafts, said printing surface being detachably connected to said carrier, said anvil being formed separately of said surface and being positively associated with said carrier and said shafts.

References Cited in the file of this patent

UNITED STATES PATENTS

| Re. 22,702 | Davidson | Dec. 4, 1945 |
| 1,120,770 | Wagner et al. | Dec. 15, 1914 |
| 1,870,117 | Henderson | Aug. 2, 1932 |
| 2,119,754 | Sinkovitz | June 7, 1938 |
| 2,140,256 | Aberle | Dec. 13, 1938 |
| 2,246,508 | Davidson | June 24, 1941 |
| 2,268,657 | Hermann | Jan. 6, 1942 |
| 2,270,273 | Davidson | Jan. 20, 1942 |
| 2,358,284 | Davidson et al. | Sept. 12, 1944 |
| 2,380,744 | Ford | July 31, 1945 |
| 2,525,982 | Wescott | Oct. 17, 1950 |

FOREIGN PATENTS

| 211,458 | Great Britain | July 10, 1924 |